US010453231B2

(12) United States Patent
Okumura

(10) Patent No.: US 10,453,231 B2
(45) Date of Patent: Oct. 22, 2019

(54) INFORMATION PROCESSING DEVICE EDITING MAP ACQUIRED FROM SERVER

(71) Applicant: BROTHER KOGYO KABUSHIKI KAISHA, Nagoya, Aichi (JP)

(72) Inventor: Fumio Okumura, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 841 days.

(21) Appl. No.: 14/990,879

(22) Filed: Jan. 8, 2016

(65) Prior Publication Data

US 2016/0203628 A1    Jul. 14, 2016

(30) Foreign Application Priority Data

Jan. 9, 2015   (JP) ................................ 2015-003560

(51) Int. Cl.
  *G06F 3/00*   (2006.01)
  *G06T 11/60*   (2006.01)
  (Continued)

(52) U.S. Cl.
  CPC .............. *G06T 11/60* (2013.01); *G01C 21/32* (2013.01); *G06F 3/04817* (2013.01);
  (Continued)

(58) Field of Classification Search
  CPC .... G06T 11/60; G01C 21/32; G06F 17/30244
  See application file for complete search history.

(56) References Cited

U.S. PATENT DOCUMENTS 6,487,305 B2 * 11/2002 Kambe ................. G01C 21/20
                                                            340/995.1
7,599,790 B2 * 10/2009 Rasmussen ............ G01C 21/32
                                                              701/532
(Continued)

FOREIGN PATENT DOCUMENTS

JP      2001-007925 A    1/2001
JP      2001-175662 A    6/2001
(Continued)

OTHER PUBLICATIONS

Asahi et al., "How to make one glance distinguishable map on information on statistics, disaster prevention and environment", first version, first printing, Kabushiki Kaisha Gijutu Hyouronsha, Dec. 15, 2014, P056, ISBN: 978-4-7741-6913-2.

(Continued)

*Primary Examiner* — Nicholas Augustine
(74) *Attorney, Agent, or Firm* — Scully Scott Murphy & Presser, P.C.

(57) ABSTRACT

In an information processing device, a controller is configured to perform: inputting drawing data to a drawing module to draw a first map image indicative of an area; inputting the specified position information indicative of a target position within the area to the drawing module to draw a second map image including the first map image and a first icon image drawn at the target position in the first map image; displaying a first screen image including the second map image; acquiring a third map image and a relative position of the first icon image with respect to the second map image upon receipt of a signal indicating a request for editing the second map image; and displaying a second screen image including a fourth map image indicating the third map image on which a second icon image is superposed at an icon position specified according to the relative position.

16 Claims, 11 Drawing Sheets

(51) Int. Cl.

| | | |
|---|---|---|
| *G06F 3/0481* | (2013.01) | |
| *G06T 1/00* | (2006.01) | |
| *H04L 29/08* | (2006.01) | |
| *H04W 4/02* | (2018.01) | |
| *G01C 21/32* | (2006.01) | |
| *G06F 16/50* | (2019.01) | |
| *G06F 3/01* | (2006.01) | |

(52) U.S. Cl.
CPC ............ *G06F 16/50* (2019.01); *G06T 1/0007* (2013.01); *H04L 67/18* (2013.01); *H04W 4/02* (2013.01); *G06T 2200/24* (2013.01)

(56) References Cited

U.S. PATENT DOCUMENTS

| | | | | |
|---|---|---|---|---|
| 9,009,177 | B2* | 4/2015 | Zheng | G06F 16/9537 707/758 |
| 9,104,293 | B1* | 8/2015 | Kornfeld | G06F 3/04817 |
| 9,146,125 | B2* | 9/2015 | Vulcano | G08G 1/0969 |
| 2006/0200384 | A1* | 9/2006 | Arutunian | G06Q 30/02 705/14.69 |
| 2008/0133579 | A1* | 6/2008 | Lim | G06F 16/9537 |
| 2008/0306684 | A1* | 12/2008 | Yamazaki | G01C 21/3673 701/532 |
| 2011/0238690 | A1* | 9/2011 | Arrasvuori | G06F 3/04812 707/769 |
| 2011/0293199 | A1 | 12/2011 | Itakura | |
| 2012/0165069 | A1 | 6/2012 | Jung et al. | |
| 2013/0339891 | A1* | 12/2013 | Blumenberg | G01C 21/26 715/771 |
| 2014/0040079 | A1* | 2/2014 | Smirin | G06Q 30/0641 705/27.1 |
| 2014/0118754 | A1* | 5/2014 | Nakamoto | G06F 3/1208 358/1.2 |
| 2015/0187100 | A1* | 7/2015 | Berry | G06T 11/20 345/634 |
| 2016/0364812 | A1* | 12/2016 | Cao | G06Q 50/01 |
| 2018/0053423 | A1* | 2/2018 | DaCosta | G06Q 10/063112 |

FOREIGN PATENT DOCUMENTS

| | | |
|---|---|---|
| JP | 2002-036638 A | 2/2002 |
| JP | 2003-084664 A | 3/2003 |
| JP | 2003-131562 A | 5/2003 |
| JP | 2004061648 A | 2/2004 |
| JP | 2006285028 A | 10/2006 |
| JP | 2008281840 A | 11/2008 |
| JP | 2011095823 A | 5/2011 |
| JP | 2011254136 A | 12/2011 |
| JP | 2012113096 A | 6/2012 |
| JP | 2014089597 A | 5/2014 |

OTHER PUBLICATIONS

Akira Suetsugu, "First Android Application Creation, Introduction of HTML5", first version, Nikkei BP Ltd., Nov. 12, 2012, P138, ISBN 978-4-8222-9617-9.

Office Action dated Aug. 21, 2018 recieved from the Japanese Patent Office in realted application 2015-003560 together with English translation.

Office Action dated Aug. 7, 2018 received from the Japanese Office in related applicatin 2015-003562 together with English language translation.

Official Action dated Nov. 30, 2016 in a related application, namely, U.S. Appl. No. 14/990,923, filed Jan. 8, 2016.

Office Action dated Feb. 12, 2019 received from the Japanese Patent Office in related application 2015-003562 together with English language translation.

\* cited by examiner

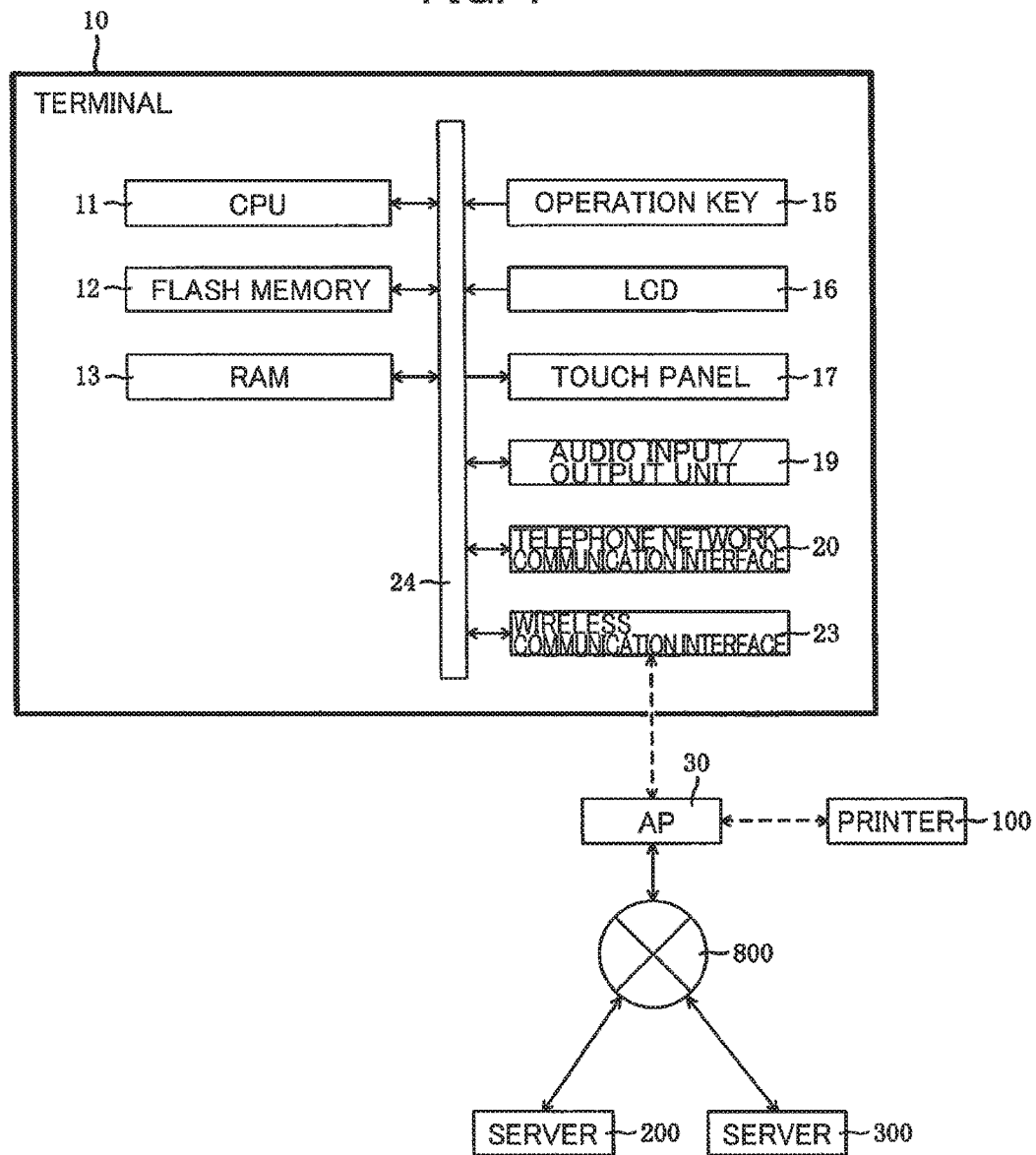

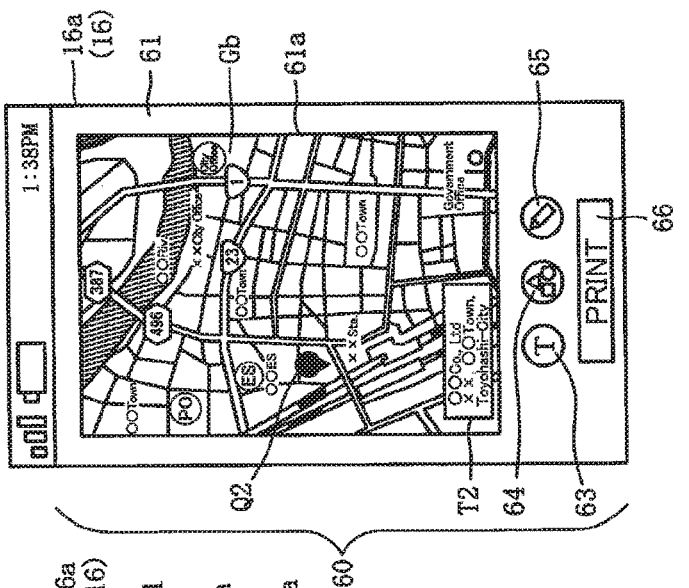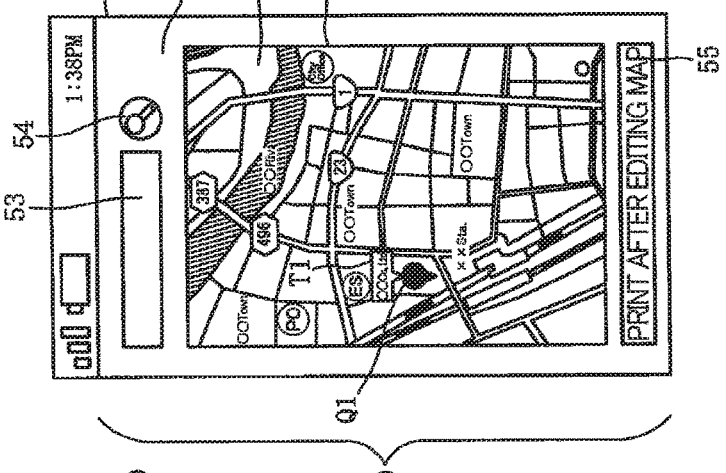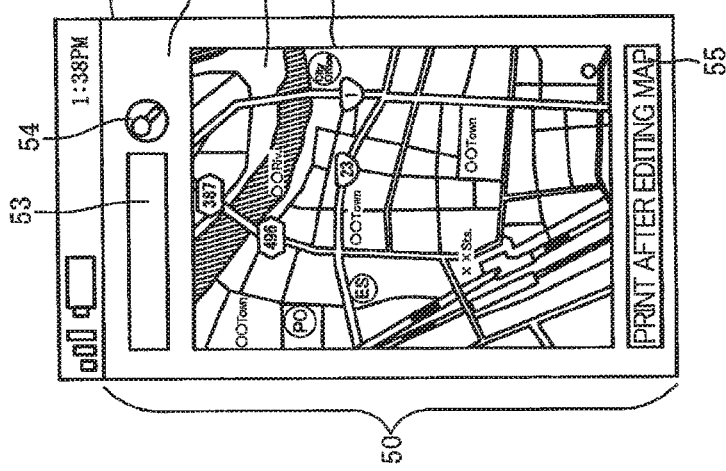

FIG. 3
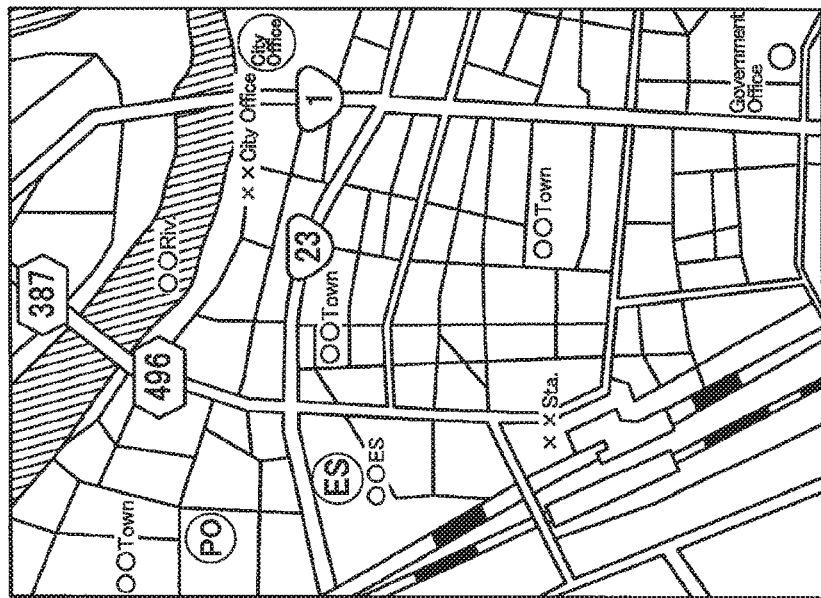
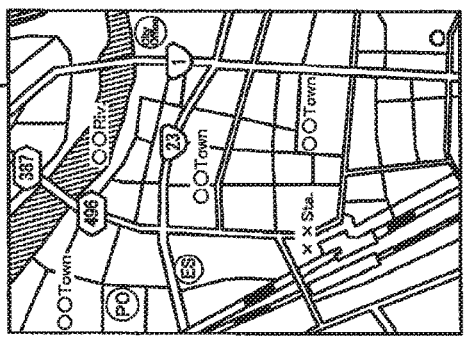

INFORMATION PROCESSING DEVICE EDITING MAP ACQUIRED FROM SERVER

CROSS REFERENCE TO RELATED APPLICATION

This application claims priority from Japanese Patent Application No. 2015-003560 filed Jan. 9, 2015. The entire content of the priority application is incorporated herein by reference.

TECHNICAL FIELD

The present disclosure relates to an information processing device and a non-transitory computer readable storage medium storing a set of program instructions installed on and executed by an information processing device.

BACKGROUND

In the related art, there have been techniques of acquiring a map from a database and printing the acquired map (for example, Japanese Patent Application Publication No. 2003-84664).

SUMMARY

However, it cannot be said that the techniques of the related art do not sufficiently respond to user's request for adding additional information to the acquired map or printing the acquired map after edition.

In view of the foregoing, it is an object of the disclosure to provide an information processing device capable of facilitating editing a map acquired from a server and a non-transitory computer readable storage medium storing a set of program instructions installed on and executed by the information processing device.

In order to attain the above and other objects, the disclosure provides a non-transitory computer readable storage medium storing a set of program instructions installed on and executed by an information processing device. The information processing device includes a display; a communication interface; a manipulation unit; and a controller. The program instructions includes: receiving first drawing data indicative of a first map image from a server through the communication interface, the first map image including at least a first area designated by position information; receiving specified position information from the server through the communication interface, the specified position information being indicative of a target position within the first area; inputting the first drawing data to a drawing module to draw a second map image on the basis of the first drawing data, the second map image being indicative of the first area; inputting the specified position information to the drawing module to draw a third map image on the basis of the specified position information, the third map image including the second map image and a first icon image drawn at the target position in the second map image and being indicative of a second area, the second area including at least a part of the first area; displaying a first screen image on the display, the first screen image including the third map image; acquiring a fourth map image upon receipt of a first signal from the manipulation unit, the first signal indicating a request for editing the third map image included in the first screen image, the fourth map image including the second area; acquiring a relative position of the first icon image with respect to the third map image upon receipt of the first signal from the manipulation unit; and displaying a second screen image on the display, the second screen image including a fifth map image indicating the fourth map image on which a second icon image is superposed at a first icon position specified on the basis of the relative position.

According to another aspect, the disclosure provides an information processing device that includes: a display; a communication interface; a manipulation unit; and a controller. The controller is configured to perform: receiving drawing data indicative of a first map image from a server through the communication interface, the first map image including at least a first area designated by position information; receiving specified position information from the server through the communication interface, the specified position information being indicative of a target position within the first area; inputting the drawing data to a drawing module to draw a second map image on the basis of the drawing data, the second map image being indicative of the first area; inputting the specified position information to the drawing module to draw a third map image on the basis of the specified position information, the third map image including the second map image and a first icon image drawn at the target position in the second map image and being indicative of a second area, the second area including at least a part of the first area; displaying a first screen image on the display, the first screen image including the third map image; acquiring a fourth map image upon receipt of a signal from the manipulation unit, the signal indicating a request for editing the third map image included in the first screen image, the fourth map image including the second area; acquiring a relative position of the first icon image with respect to the third map image upon receipt of the signal from the manipulation unit; and displaying a second screen image on the display, the second screen image including a fifth map image indicating the fourth map image on which a second icon image is superposed at an icon position specified on the basis of the relative position.

BRIEF DESCRIPTION OF THE DRAWINGS

The particular features and advantages of the disclosure as well as other objects will become apparent from the following description taken in connection with the accompanying drawings, in which:

FIG. 1 is a block diagram illustrating an electrical configuration of a terminal;

FIGS. 2A, 2B, and 2C are schematic diagrams illustrating an outline of the present disclosure;

FIG. 3 is a schematic diagram illustrating an outline of the present disclosure;

DETAILED DESCRIPTION

Figure 4:
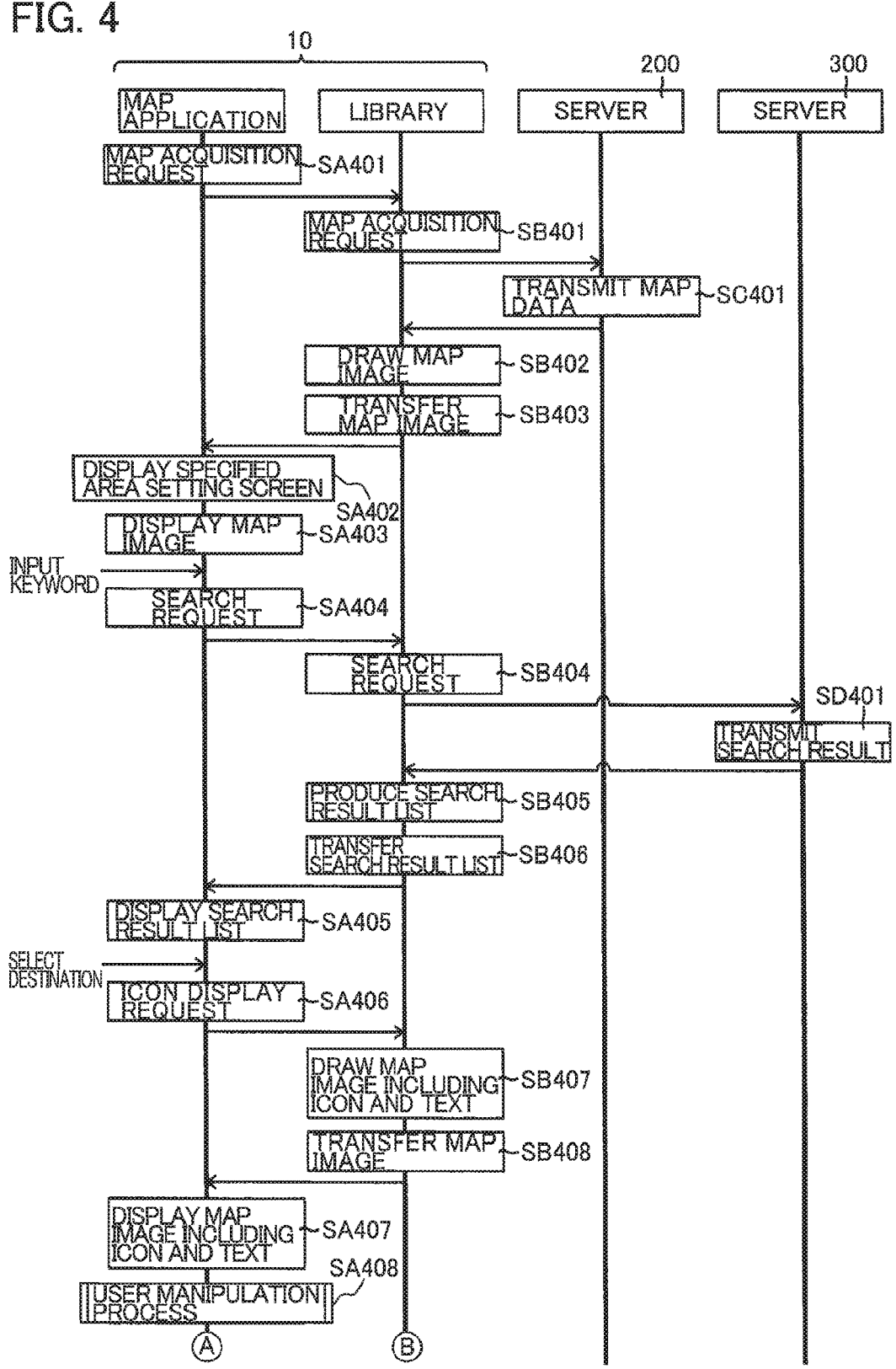
FIG. 4 is a sequence diagram explaining an operation of a terminal which is realized according to a map application.

Hereinafter, preferred embodiments of the present disclosure will be described while referring to the accompanying drawings. First, a first embodiment of the present disclosure will be described with reference to FIGS. 1 to 10. FIG. 1 is a block diagram illustrating an electrical configuration of a terminal 10 where a map application as one embodiment of an information processing program according to the present disclosure is installed.

In the embodiment, the terminal 10 is configured as a mobile terminal such as a smartphone. A CPU 11, a flash memory 12, a RAM 13, an operation key 15, an LCD 16, a touch panel 17, an audio input/output unit 19, a telephone network communication interface 20, and a wireless communication interface 23 are installed in the terminal 10. These components are connected to each other via a bus line 24.

The CPU 11 controls the components connected to the bus line 24 according to a program or a fixed value stored in the flash memory 12. The flash memory 12 is a rewritable nonvolatile memory and stores programs such as an operating system (hereinafter, referred to as an "OS") and a map application.

The OS is basic software implementing basic functions of the terminal 10. In the embodiment, the OS is Android® (Android is a registered trademark). In addition, hereinafter, in some cases, the CPU 11 which executes a program such as an OS or an application may be denoted by only a program name thereof. For example, in some cases, the term "application" may denote the "CPU 11 executing the application". Various applications including the map application control the components of the terminal 10 by using an API (Application Programming Interface) installed in the OS.

The map application according to the embodiment allows a map image based on map data acquired from the server 200 to be drawn and allows the drawn map image to be displayed in the LCD 16. In addition, in the embodiment, the map data acquired from the server 200 are vector-format image data (hereinafter, referred to as "vector data"). The map application inputs map data acquired from server 200 to a dedicated library installed in the terminal 10 to acquire a bitmap-format map image which is drawn by the library.

In addition, the map application according to the embodiment acquires from the server 200 the map data of the map of which the zoom level is raised in accordance with the paper size (for example, A4 size) of the printing paper (namely, the map scale is enlarged) in response to an input from a user in a case where a to-be-edited map area (hereinafter, referred to as a "specific map area") with respect to a map image being displayed in the LCD 16 is specified. Consequently, in the case of printing the specific map area for which the editing is ended, a map which is larger than the map image being displayed in the LCD 16 and of which the zoom level is in accordance with the paper size is printed on the printing paper. Further, the map area indicates an area uniquely defined by four sets of latitude/longitude information.

Further, the "zoom level" is a value designating the scale of the map. A case where the zoom level is zero corresponds to the smallest-scale map. The higher the value of the zoom level is, the larger the map scale is. For each zoom level N (N is an integer greater than or equal to 0), a map of the world is divided into $2^N \times 2^N$ square areas, and vector data for the maps of the square areas are stored in the server 200 used in the embodiment. In other words, in the embodiment, as the value of the zoom level N is increased by 1, the map scale is enlarged two times. The index "N" of the zoom level is a value of greater than or equal to 0 and less than or equal to a maximum value which is allowed according to a type of a map (for example, a normal map or an aeronautical map) as a target.

Further, in the server 200, the vector data of the map include more detailed information (for example, narrower alley way, more detailed place names, more detailed building names, and more detailed signalized intersection names) so that, the higher the value of the zoom level N is, that is, the larger the map scale is, the more detailed map the map application can draw. Therefore, the higher the value of the zoom level is, the more detailed information such as narrow alley way, building names, and signalized intersection names the map application can display.

As described above, according to the map application of the embodiment, the map which is larger than the map image being displayed in the LCD 16 and of which the zoom level is in accordance with the paper size can be printed on the printing paper. In other words, according to the map application of the embodiment, detailed information that is not included in the map image displayed in the LCD 16 can be printed on the printing paper.

Even when an information amount to be displayed on a map is maintained intact whereas a physical size of the map image is enlarged, since the relative information amount with respect to the physical size of the map image is decreased, there may be a problem in that the map is not easy to read. In contrast, according to the map application of the embodiment, since the map of which the zoom level is in accordance with the paper size is printed, the occurrence of the problem can be suppressed. In other words, according to the map application of the embodiment, the map of the specific map area can be printed as an easy-to-read map.

Hereinafter, a physical size of an image (that is, the number of pixels in the vertical direction and the number of pixels in the horizontal direction) is simply referred to as an "image size" or a "size of an image". In other words, in the description hereinafter, the term "image size" or "size of an image" does not denote a data size.

In addition, in the case of printing a map image of which the zoom level is equal to that of the map image being displayed in the LCD 16 on a printing paper which is larger than the LCD 16, the map image being displayed in the LCD 16 needs to be enlarged in accordance with the paper size. Since the area on the printing paper corresponding to one pixel on the LCD 16 is increased in a case where the map image is enlarged, the image becomes rough corresponding to the increase in the area. In contrast, according to the map application of the embodiment, as described above, since the map data of the map of which the zoom level is heightened in accordance with the paper size of the printing paper are acquired from the server 200, a bitmap-format map image drawn on the basis of the map data does not need to be enlarged at the time of printing. Consequently, the map of the specific map area can be printed with an appropriate image quality.

In addition, in a case where the specific map area is specified, the map application according to the embodiment arranges various types of objects to be superposed on the map image of the specific map area drawn on the basis of the map data which are acquired from the server 200 with the zoom level being heightened. As the objects superposed on the map image, for example, there are an icon image indicating a designated position (that is, a destination) designated by the user and a text indicating information on the designated position. Therefore, since various types of the objects superposed on the map image can be freely moved or the contents thereof can be changed without requiring re-drawing of the map image, editing work becomes easy.

The RAM 13 is a rewritable volatile memory which temporarily stored various types of information on the execution of the printing application executed by the CPU 11. The operation key 15 is a mechanical key for inputting instructions to the terminal 10 and is installed, for example, in a casing of the terminal 10. The LCD 16 is a liquid crystal display device displaying various types of screens. The touch panel 17 is installed to overlap the LCD 16. By touching or approaching the LCD 16 with a pointer such as a finger or a stick, instruction is input to the terminal 10. The audio input/output unit 19 is a device for inputting or outputting audio which is configured with a microphone or a speaker. The telephone network communication interface 20 is a circuit for performing communication via a mobile telephone network (not shown).

The wireless communication interface 23 is an interface for performing wireless communication via a wireless LAN. In the embodiment, the communication performed by the wireless communication interface 23 is wireless communication via a wireless LAN in accordance to the IEEE802.11b/g/n standards. More specifically, the communication is wireless communication (so-called "Wi-Fi® communication" (Wi-Fi is a registered trademark)) in accordance to the Wi-Fi® standard. In the embodiment, the wireless communication interface 23 is connected to a printer 100 through an access point (hereinafter, referred to as an "AP") 30 which is a relay device.

The AP 30 is a relay device which relays the Wi-Fi® communication. The AP 30 has a broadband router function and can be connected to the Internet 800. Therefore, the terminal 10 can be communicatably connected to various external devices such as servers 200 and 300 through the AP 30 and the Internet 800.

The server 200 is a map server providing the map data. In the embodiment, the server 200 provides the map data configured with the vector data by using Google Maps® API (Google Maps is a registered trademark). As described above, in the server 200, the vector data of divided maps obtained by dividing the map of the world into $2^N \times 2^N$ square areas for each zoom level N are prepared.

The server 300 is a server providing information (hereinafter, referred to as "location information") on locations or shops on the map. In the embodiment, the server 300 provides the location information by using Google Place® API (Google Place is a registered trademark). Further, the server 200 and the server 300 are not limited to servers using the aforementioned APIs provided by the Google® (Google is a registered trademark). Any appropriate server providing map data or location information can be employed as the server 200 or the server 300.

The map application according to the embodiment acquires various data by receiving and processing various data from the servers 200 and 300 by using a library of the Google Maps® API installed in the terminal 10. For example, the map application requests the library to acquire the map and receives the map image from the server 200 which the library draws on the basis of the map data acquired from the server 200 according to the request. Further, the library draws the bitmap-format map image having a size according to the size of the screen of the LCD 16 on the basis of the map data from the server 200. In the following description, "to draw map data" denotes to draw a bitmap-format image from vector data.

The overview of the present disclosure will be described with reference to FIGS. 2 and 3. FIG. 2 is a schematic diagram illustrating an example of the screen which the map application according to the embodiment displays in the LCD 16. As described above, the map application according to the embodiment displays the map image drawn by the library on the display area 16a of the LCD 16 on the basis of the map data acquired from the server 200 through the library. For example, in a case where the map application is started, the map application displays the map image drawn by the library on the display area 16a on the basis of the map data of the periphery of the current location acquired through the library.

Consequently, for example, as illustrated in FIG. 2A, the screen 50 including the map image Ga of the periphery of the current location is displayed on the display area 16a. The screen 50 is a screen on which the user sets the specific map area. The screen 50 (hereinafter, referred to as an "area setting screen 50") includes a margin image 51. The margin image 51 is a semi-transparent image superposed on the map image Ga and has a display frame 51a. The map image Ga is displayed within the display frame 51a so that the user can visibly recognize the map image. Further, the map image Ga drawn by the library is configured to have a size larger than the screen size of the display area 16a. In the portion superposed on the margin image 51, the map image Ga is displayed in a manner that the color is lighter than that of the inner portion of the display frame 51a.

An aspect ratio of the display frame 51a is set to be an aspect ratio of a predetermined paper size (in the embodiment, A4 size). Therefore, the user can identify the to-be-printed area of the map from the map image Ga which can be visibly recognized within the display frame 51a.

The area setting screen 50 includes a search box 53 and a search button 54. The user can input keywords about the destination in the search box 53. If the user performs tap manipulation on the search button 54 with the keyword input to the search box 53, the map application acquires the result of a periphery search about the keyword from the server 300 through the library and displays the search result as a list.

In a case where the user performs manipulation of selecting the destination from the list, the map application allows the library to draw the map image including an icon indicating the selected destination and a text indicating the name of the destination and updates the map image Ga being displayed on the area setting screen 50 to the map image including the icon and the text that the library draws. Consequently, for example, as illustrated in FIG. 2B, in the area setting screen 50, the map image displayed within the display frame 51a is updated to the map image Ga including an icon Q1 and a text T1.

The area setting screen 50 includes an editing request button 55. If the user performs tap manipulation on the editing request button 55, the area in the map image Ga surrounded by the display frame 51a, that is, the area of the map image Ga visibly recognized by the user is specified as a specific map area (that is, a to-be-edited map area). Next, in response to the manipulation on the editing request button 55, instead of the area setting screen 50, an editing screen 60 for editing the detailed map image is displayed on the display area 16a.

As described above, if the specific map area is specified, the map application according to the embodiment acquires through the library from the server 200 the map data of the map of which the zoom level is heightened in accordance with a predetermined paper size whereas in which the specific map area is maintained intact. The map application displays the map image Gb which the library draws on the basis of the map data on the editing screen 60. Consequently, for example, the editing screen 60 illustrated in FIG. 2C is displayed on the display area 16a.

The editing screen 60 includes a margin image 61. The margin image 61 is a non-transparent image superposed on the map image Gb and has a display frame 61a. A map image Gb, that is, a map image of the specific map area is displayed within the display frame 61a. Therefore, the user can identify the to-be-printed map image Gb by using the partition of the display frame 61a.

As aspect ratio of the display frame 61a is set to be an aspect ratio of a predetermined paper size (in the embodiment, A4 size). In other words, the aspect ratio of the display frame 61a is equal to the aspect ratio of the display frame 51a of the area setting screen 50. Therefore, the user is allowed to recognize that the map area included in the map image Gb displayed within the display frame 61a is equal to the area set as the specific map area in the area setting screen 50, so that a feeling of security can be given to the user.

While the map image Ga displayed on the area setting screen 50 is a map image including the icon and the text which the library draws, the icon and the text are not drawn in the map image Gb included in the editing screen 60. Alternatively, the icon image Q2 and the text T2 as objects superposed on the map image Gb are displayed at the positions of the icon and text included in the map image Ga. Therefore, in the editing screen 60, the moving or content-changing of the icon image Q2 and the text T2 can be implemented without re-drawing of the map by the library.

The editing screen 60 includes a text editing button 63, an icon add button 64, and a free-line write button 65. In a case where the user performs manipulation on the buttons 63 to 65, the map application enables editing according to the manipulated button. For example, in a case where the user performs manipulation on the icon add button 64, the map application enables adding of the icon image and editing of the added icon image.

The editing screen 60 includes a printing button 66. In a case where the user performs manipulation on the printing button 66, the map application transmits the printing data to the printer 100 so that the contents displayed within the display frame 61a are printed in the printer 100. As a result, the map image Gb including the icon image Q2 which reflects the contents edited as needed is printed on the printing paper in the printer 100.

FIG. 3 is a diagram illustrating calculation of the zoom level for obtaining the map image Gb from the map image Ga. As described above, in a case where the specific map area is set, the map application according to the embodiment acquires from the server 200 the map data of the map of which the zoom level is heightened in accordance with the paper size whereas the specific map area is maintained intact.

For example, as illustrated in FIG. 3, in a case where the area surrounded by the display frame 51a in the map image Ga is set as the specific map area, in response to the manipulation of the button 55, the map application calculates the zoom level so that the specific map area have the same size as that of the map image Gb at the time of printing. Next, the map application acquires the map data of the map with the calculated zoom level from the server 200.

In other words, the zoom level higher than the zoom level (hereinafter, referred to as a "display zoom level") Za in the map image Ga being displayed in the LCD 16 is calculated as the zoom level (hereinafter, referred to as a "target zoom level") Zb for obtaining the map image Gb having an image size larger than the size of the specific map area. The target zoom level Zb can be calculated from the display zoom level Za, the number of pixels Pa in the horizontal direction on the screen of the LCD 16, and the number of pixels Pb in the horizontal direction as a target at the time of printing. Further, not the number of pixels in the horizontal direction on the screen of the LCD 16 but the number of pixels in the horizontal direction on the display area 16a of the map image on the screen may be defined as the number of pixels Pa.

More specifically, in a case where it is defined that the map scale is enlarged two times as the value of the zoom level is increased by 1, a value obtained by adding Za to the logarithm of an anti-log Pb/Pa to base 2 is calculated as the target zoom level Zb. In other words, $Zb = Za + \log_2(Pb/Pa)$.

In the embodiment, a paper size and a printing resolution at the time of printing are determined in advance. More specifically, it is determined that the paper size is A4 size (297 mm×210 mm) and the printing resolution is 248 dpi (dots per inch). In this condition, the number of pixels at the time of printing is set to 2896×2048 pixels. Further, the number of pixels as 2896×2048 pixels is calculated as an example of the value where the size of the map image is included within the paper when the map image is printed on the A4-sized paper with 248 dpi. However, an appropriate value which is lower than or equal to the number of pixels (that is, 2900×2050 pixels) obtained by multiplying the total vertical and horizontal lengths of the A4 size by the printing resolution may be employed.

In a case where the number of pixel at the time of printing is 2896×2048 pixels, for example, if the number of pixels on the screen of the LCD 16 is 800×480 pixels (screen size: 81 mm×61 mm, display resolution: about 233 dpi), the $\log_2(Pb/Pa)$ is $\log_2(2048/480)$, that is, about 2.0931. In a case where the display zoom level Za is set to 5, in this example, the target zoom level Zb is about 7.0931.

In a case where it is defined that the map scale is enlarged two times as the value of the zoom level is increased by 1, the increase of 2.0931 in zoom level corresponds to a multiple of 2 to the power 2.0931 (that is, about 4.3) in scale of the map. Therefore, in this example, the map image is drawn with such a zoom level that the scale of the map image being displayed is set to a multiple of 2 to the power 2.0931 (that is, about 4.3). In other words, in the map image drawn with the target zoom level Zb, the distance on the map per unit number of pixels is about 1/4.3 of the map image being displayed (that is, the map image drawn with the display zoom level Za), and thus, a more detailed map is drawn. Hereinafter, the map image drawn with the target zoom level Zb calculated from the above-described Equation $Zb = Za + \log_2(Pb/Pa)$ is referred to as a "detailed map image".

Further, in the above example, the target zoom level Zb is calculated by using the number of pixels on the screen of the LCD 16 and the number of pixels in the printing period. However, with respect to the number of pixels on the screen of the LCD 16 and the number of pixels at the time of printing, the values thereof calculated in advance on the basis of the above-described condition may be included in a source code of the map application. Alternatively, the map application may calculate the values thereof on the basis of resolution of the screen of the LCD 16, the paper size, and the printing resolution every time.

In addition, in the above example, the target zoom level Zb is calculated by using the number of pixels on the screen of the LCD 16 and the number of pixels at the time of printing. Alternatively, the number of pixels on the screen of the LCD 16 may be calculated from the screen size and the display resolution, and the calculated number of pixels may be used to calculate the target zoom level Zb. Similarly, the number of pixels in the printing period may be calculated from the paper size and the printing resolution, and the calculated number of pixels may be used to calculate the target zoom level Zb.

In addition, in the above example, the number of pixels Pa and the number of pixels Pb are set as the number of pixels in the horizontal direction on the screen of the LCD 16 and the number of pixels in the horizontal direction as the target at the time of printing, respectively. Alternatively, the number of pixels Pa and the number of pixels Pb may be set to as the number of pixels in the vertical direction on the screen of the LCD 16 and the number of pixels in the vertical direction as the target at the time of printing. In a case where the number of pixels Pb is set as the number of pixels in the vertical direction as the target at the time of printing, the number of pixels in the vertical direction on the display area 16*a* of the map image on the screen of the LCD 16 may be set as the number of pixels Pa.

Operations of the terminal 10 implemented by the map application according to the embodiment will be described with reference to FIGS. 4 to 9. In addition, in sequence diagrams illustrated in FIGS. 4 and 6, the processes in the line of the map application are processes executed by the CPU 11 according to the map application stored in the flash memory 12. On the other hand, the processes in the line of the library are processes executed by the CPU 11 according to the library.

Hereinafter, in the sequence diagrams and the flowcharts, although the entity executing the processes according to the map application or the library is the CPU 11, the CPU 11 executing the map application or the library is simple referred to as a "map application" or a "library", respectively, for the purpose of distinguishing from programs executing the processes.

As illustrated in FIG. 4, the map application transfers a map acquisition request to library (SA401). The map acquisition request in SA401 includes network information such as an MAC address of the AP 30, a map type (for example, a normal map or an aerial map), and an initial value (for example, 5) of the zoom level.

When the library receives the map acquisition request from the map application, the library transmits the map acquisition request to the server 200 (SB401). The map acquisition request which is to be transmitted in SB401 includes the map type and the zoom level received from the map application and current location information. The current location information is information of latitude and longitude indicating the current location. Further, the library transmits the network information received from the map application to a location service (not shown) through the wireless communication interface 23 and acquires the current location information from the service.

When the server 200 receives the map acquisition request from the terminal 10, the server transmits the map data in response to the map acquisition request (SC401). More specifically, the server 200 transmits to the terminal 10 the map data of the map having the scale designated with the zoom level where the latitude and longitude of the current location information are centered in the map of which the type is specified by the map type.

The library draws the map image based on the map data received from the server 200 (SB402). In addition, the map image drawn by the library is a bitmap-format drawing data and is stored in a frame buffer installed on the RAM 13.

The library transfers the drawn map image to the map application (SB403). In addition, the library transfers the current location information received from the location service to the map application. The map application displays the specified area setting screen 50 on the display area 16*a* of the LCD 16 (SA402). The map application displays the map image received from the library so that the latitude and longitude indicated by the current location information are centered on the display frame 51*a* (SA403).

In a case where tap manipulation on the search button 54 is input through the touch panel 17, the map application acquires the text of the keyword input to the search box 53 and transfers a search request including the text and the current location information to the library (SA404). When the library receives the search request from the map application, the library transmits the search request to the server 300 through the wireless communication interface 23 (SB404).

When the server 300 receives the search request from the terminal 10, the server executes search according to the keyword in response to the search request by setting the periphery of the current location of the terminal 10 as a target. The server 300 transmits the search result to the terminal 10 (SD401). The search result includes location information of each location specified by the search. The location information is text information and includes a location name, an address, a phone number, and a location attribute, and latitude and longitude indicating the location. Further, the location attribute is a classification item classifying the location, for example, restaurant, hotel, parking lot, or others.

The library produces a search result list from the search result received from the server 300 (SB405) and transfers the search result list to the map application (SB406). When the map application receives the search result list from the library, the map application displays the search result list on the specified area setting screen 50 (SA405). In a case where manipulation of selecting the destination from the search result list is input through the touch panel 17, the map application transfers an icon display request to the library (SA406).

The icon display request includes a location name, an address, latitude and longitude, and an icon image of the selected destination. The location name, the address, and the latitude and longitude of the selected location are the location name, the address, and the latitude and longitude included in the location information corresponding to the selected destination in the location information included in the search result list. The icon image is the icon image according to the location attribute included in the location information corresponding to the selected destination among the icon images prepared in the map application.

Further, in the map application, the icon image according to the location attribute is prepared every location attribute. In the map application according to the embodiment, icon images having the same appearance, of which colors are different according to the location attributes, are prepared. Therefore, the user is allowed to recognize the location attribute according to the icon image or the color of the icon. Further, the icon images of which appearances are different according to the location attribute may be configured to be prepared.

When the library receives the icon display request from the map application, the library draws the map image including the icon and the text according to the selected destination on the basis of the icon display request and the map data including the current location acquired in advance from the server 200 (SB407).

Further, in SB407, the library draws the icon based on the icon image included in the icon display request at the position of the latitude and longitude included in the icon display request in the map image. In addition, the library draws the text of the location name and the address included in the icon display request at a predetermined specified position in the map image.

The library transfers the map image including the drawn icon and text to the map application (SB408). The map application displays the map image including the icon and the text received from the library on the specified area setting screen 50 (SA407). The map application executes a user manipulation process (SA408). The user manipulation process (SA408) is a process of changing the map image which is to be displayed on the specified area setting screen 50 in response to user manipulation.

Figure 5:
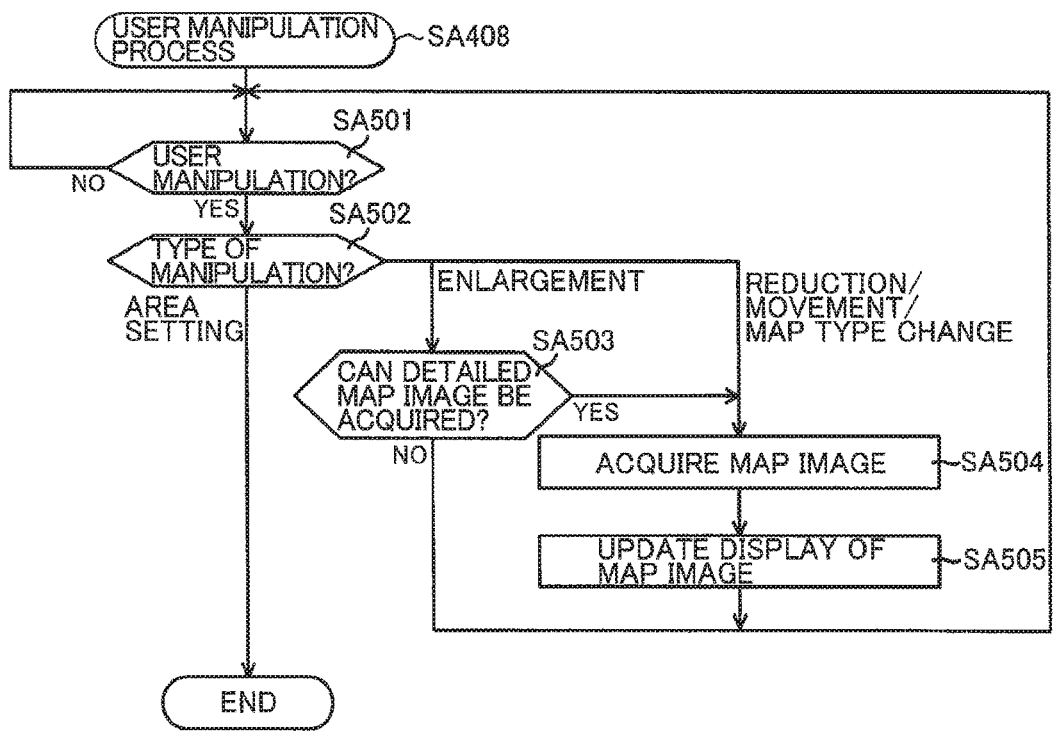
FIG. 5 is a flowchart illustrating steps of a user manipulation process in a first embodiment.

The aforementioned user manipulation process (SA408) will be described with reference to FIG. 5. A flowchart illustrated in FIG. 5 shows a process executed by the CPU 11 through the map application. The map application waits for the input of the user manipulation performed through the touch panel 17 on the area setting screen 50 (SA501: NO). When the user manipulation on the area setting screen 50 is input (SA501: YES), the map application determines the type of the input manipulation (SA502).

In a case where the map application determines that the input manipulation is manipulation of instructing reduction of the scale of the map, movement of the display area of the map image, or a change in map type (SA502: REDUCTION/MOVEMENT/MAP TYPE CHANGE), the map application acquires the map image reflecting the change according to the user manipulation (SA504).

More specifically, the map application transmits the map acquisition request to the server 200 through the library. In this case, the map acquisition request includes the latitude and longitude of the center of the map image and the zoom level. the server 200 receiving the map acquisition request replies with the map data of the map image reflecting the change according to the user manipulation. The library draws the map image based on the map data transmitted from the server 200 and transfers the map image to the map application.

For example, in a case where the user manipulation is swipe manipulation of changing the display area of the map image, the map acquisition request includes the latitude and longitude of the center of the map image of the movement destination determined according to the swipe manipulation and the current zoom level. In this case, the server 200 transmits to the terminal 10 the map data of the map having the scale designated with the zoom level where the latitude and longitude of the movement destination are centered. As a result, the map application acquires the map image drawn by the library as the map image after the movement according to the swipe manipulation.

The latitude and longitude of the center of the map image of the movement destination according to the swipe manipulation can be calculated from the latitude and longitude of the current center, the starting and ending points of the swipe manipulation, and the current zoom level. More specifically, the numbers of pixels moved in the vertical and horizontal directions as a movement amount are calculated from the starting and ending points of the swipe manipulation. Since a width of the latitude corresponding to the number of pixels moved in the vertical direction and a width of the longitude corresponding to the number of pixels moved in the horizontal direction are calculated from the number of pixels in the vertical direction and the number of pixels in the horizontal direction and the current zoom level, the latitude and longitude of the center of the map image of the movement destination are calculated from these values and the latitude and longitude of the current center.

After the process of SA504, the map application displays the acquired map image so that the latitude and longitude transmitted to the server 200 become the center of the display frame 51a (SA505) and allows the process to proceed to SA501. Further, when the map image is moved, in a case where the destination selected by the user is included in the map image of the movement destination, the library draws the map image including the icon and the text. On the other hand, in a case where the destination selected by the user is not included in the map image of the movement destination, the library draws the map image not including the icon and the text.

On the other hand, in a case where the map application determines that the input manipulation is manipulation instructing the enlargement of the map scale (for example, pinch-out manipulation) (SA502: ENLARGEMENT), with respect to the map image of which the scale is enlarged according to the user manipulation, the map application determines whether or not the detailed map image can be acquired from the map image (SA503). Further, the detailed map image is the map image drawn with the target zoom level $Z_b$ which is calculated from the above equation $Z_b=Z_a+\log_2(P_b/P_a)$ on the basis of the display zoom level $Z_a$.

Therefore, in SA503, in a case where the zoom level of the map image of which the scale is enlarged according to the user manipulation is set to the display zoom level $Z_a$, the map application determines whether or not the zoom level (that is, target zoom level $Z_b$) for obtaining the detailed map image is lower than or equal to the maximum value which can be taken as the zoom level.

More specifically, first, the map application calculates the display zoom level $Z_a$ of the map image of which the scale is enlarged according to the user manipulation. The display zoom level $Z_a$ is calculated on the basis of the distance of the pinch-out manipulation and the current zoom level. Further, the user may instruct the value of the zoom level. In this case, the instructed value of the zoom level and the latitude and longitude of the center of the map image being displayed on the area setting screen 50 may be output to the server 200 through the wireless communication interface 23.

Next, the map application calculates the target zoom level $Z_b$ from the calculated value of $Z_a$, the number of pixels $P_a$ in the horizontal direction on the screen of the LCD 16, and the number of pixels $P_b$ in the horizontal direction as a target at the time of printing according to the above equation $Z_b=Z_a+\log_2(P_b/P_a)$. The map application determines whether or not the calculated $Z_b$ is the maximum value which can be taken as the zoom level. Further, the number of pixels in the vertical direction and the number of pixels in the horizontal direction on the screen of the LCD 16 are stored as specifications of the terminal 10 in the flash memory in advance.

In the server 200, the maximum value which can be taken as the zoom level is determined for each map type (for example, a normal map or an aerial map). In the map application, the maximum value which can be taken as the zoom level in the server 200 is prepared for each map type. Further, the maximum value of the zoom level which van be taken for the map of the type being displayed may be queried to the server 200 at every necessary time.

In a case where the map application determines that the calculated Zb is smaller than or equal to the maximum value which can be taken as the zoom level, the map application determines that the detailed map image can be acquired from the map image of which the scale is enlarged according to the user manipulation and affirms the determination of SA503. On the other hand, in a case where the map application determines that the calculated Zb is larger than the maximum value which can be taken as the zoom level, the map application negates the determination of SA503.

In a case where the map application affirms the determination of SA503 (SA503: YES), the map application acquires the map image of which the scale is enlarged according to the user manipulation (SA504), and more specifically, the map application transmits the map acquisition request to the server 200 through the library. In this case, the map acquisition request includes the latitude and longitude of the center of the map image being displayed and the display zoom level Za calculated in response to the user manipulation. The server 200 receiving the map acquisition request replies with the map data of the map image of which the scale is enlarged according to the user manipulation. The library draws the map image based on the map data transmitted from the server 200 and transfers the map image to the map application.

On the other hand, in a case where the map application negates the determination of SA503 (SA503: NO), the CPU 11 allows the process to proceed to SA501. Therefore, in a case where the detailed map image cannot be acquired from the map image of which the scale is enlarged according to the user manipulation, the scale enlargement is prohibited, and the map image being displayed is maintained. In other words, in the embodiment, only the map image with the zoom level from which the detailed map image can be acquired is displayed on the area setting screen 50.

In a case where the target zoom level Zb calculated with respect to the display zoom level Za in response to the instruction of enlargement of the map scale exceeds the maximum value which can be taken as the zoom level, there is a possibility that the scale appropriate to the image size is not secured for the detailed map image and an undesired printing result may be obtained. In contrast, in the embodiment, in a case where the detailed map image cannot be acquired from the map image of which the scale is enlarged according to the user manipulation, since the scale enlargement is prohibited, an appropriate printing result with respect to the detailed map image can be secured for the user.

In a case where the map application determines that the input manipulation is manipulation on the editing request button 55, that is, the manipulation instructing the setting of the specific map area (SA502: AREA SETTING), the map application ends this process and executes the process illustrated in the flowchart of FIG. 6 as a preparation process before proceeding to the editing screen 60.

Figure 6:
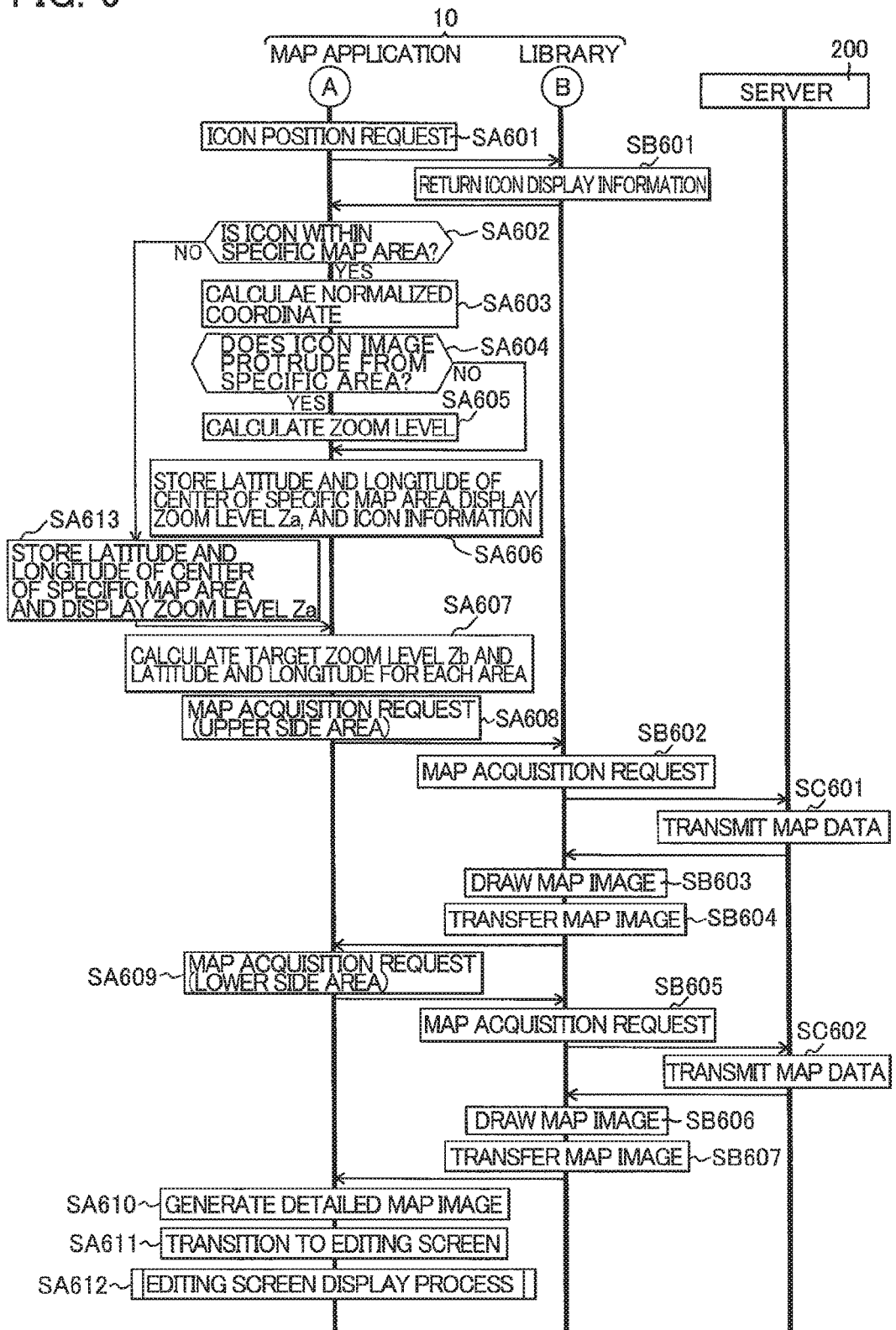
FIG. 6 is a sequence diagram explaining an operation of the terminal which is realized according to the map application.

As illustrated in FIG. 6, the map application transfers an icon position request to the library (SA601). The icon position request includes the latitude and longitude of the destination. The latitude and longitude of the destination are the latitude and longitude specified when the destination is selected by the user. When the library receives the icon position request from the map application, the library returns the icon display information to the map application (SB601). The icon display information is the information indicating which coordinate the icon is positioned with respect to the origin of the map image currently being displayed on the area setting screen 50, and the icon display information can take a positive or negative value. Further, the origin of the map image is, for example, the coordinate of the upper left point of the display frame 51*a*.

When the map application receives the icon display information from the library, the map application determines whether or not the icon is within the specific map area (SA602). The map application performs the determination on the basis of the icon display information received from the library, the number of pixels of the map image being displayed, and the coordinate of the specific map area in the map image being displayed.

In a case where the map application determines that the icon is within the specific map area (SA602: YES), the map application calculates the normalized coordinate of the icon position (SA603). The normalized coordinate of the icon position is the relative position of the icon in the map image of the specific map area. More specifically, the normalized coordinate of the icon position is configured with the value indicating at what percent position of the entire area the icon exists from the upper side in the vertical direction of the map image in the specific map area and the value indicating at what percent position of the entire area the icon exists from the left side in the horizontal direction of the map image in the specific map area. The map application calculates the normalized coordinate of the icon position on the basis of the icon display information received from the library, the number of pixels of the map image being displayed, and the coordinate of the specific map area in the map image being displayed.

In a case where the destination is a location close to the edge of the specific map area, the entire icon image may not be within the specific map area, but the entire icon image may protrude from the specific map area. Therefore, the map application determines whether or not the icon image protrudes from the specific map area (SA604).

In a case where the latitude and longitude of the destination are within a predefined range in the specific map area, the map application determines that the icon image protrudes from the specific map area, and the map application affirms the determination of SA604. On the other hand, in a case where the latitude and longitude of the destination are not within the range, the map application determined that the icon image does not protrude from the specific map area, that is, the entire icon image is within the specific map area, and the map application negates the determination of SA604.

The predefined ranges can be determined according to the size of a circumscribed rectangle of the icon image and are installed at the upper, right, and left sides of the specific map area. The reason why the predefined range is not installed at the lower side of the specific map area is as follows. Since the icon image is arranged at the upper side of the destination in the map image, although the destination is located close to the lower edge of the specific map area, the icon image does not downwardly protrude from the specific map area.

In a case where the map application negates the determination of SA604, that is, in a case where the map application determines that the entire icon image is within the specific map area (S604: NO), the map application allows the process to proceed to SA606. On the other hand, in a case where the map application affirms the determination of SA604 (SA604: YES), the map application calculates the zoom level lower than the current value so that the icon image does not protrude from the specific map area (SA605), and the map application allows the process to proceed to SA606. According to the SA605, the printing in the state where the icon image protrudes from the specific map area can be suppressed.

The map application stores the latitude and longitude of the center of the specific map area, the display zoom level Za, and the icon information in the flash memory 12 (SA606), and the map application allows the process to proceed to SA607. Further, the display zoom level Za is the value of the current zoom level or the zoom level calculated in SA605. The icon information includes the text indicating the normalized coordinate calculated in SA603, the icon image ID, and the arranged location (that is, destination) of the icon.

The icon image ID is an ID individually specifying an icon image, and each icon image ID is assigned to each location attribute. The icon information includes the icon image ID associated with the location attribute included in the location information corresponding to the selected destination among the icon image IDs. The text indicating the arranged location of the icon is the location name, address, and phone number included in the location information corresponding to the selected destination.

In a case where the map application determines in SA602 that the icon is not within the specific map area (SA602: NO), the map application stores the latitude and longitude of the center of the specific map area and the display zoom level Za in the flash memory 12 (SA613), and the map application allows the process to proceed to SA607. In the embodiment, in a case where the icon is not included in the specific map area, since the icon image is not displayed, the icon information is not stored.

Further, in a case where the map application negates the determination of SA602, the map application sets a predetermined flag installed in the RAM 13 to ON. The flag indicates whether or not the icon image is to be displayed in the detailed map image. In a case where the map application performs the determination of SA602, the flag is set to OFF.

After the process of SA613 or SA606, the map application calculates the target zoom level Zb and the latitude and longitude for acquiring the map data of the upper and lower divided areas of the specific map area (SA607). More specifically, the map application calculates the target zoom level Zb from the display zoom level Za stored in SA606 or SA613, the number of pixels (that is, the number of pixels Pa) in the horizontal direction on the screen of the LCD 16, and the number of pixels Pb in the horizontal direction as a target at the time of printing according to the above equation $Zb=Za+\log_2(Pb/Pa)$.

In addition, the map application calculates the latitude and longitude of each center of the upper and lower side areas from the latitude and longitude of the center of the specific map area and the display zoom level Za. In other words, since a width of the latitude corresponding to the number of pixels in the vertical direction on the screen of the LCD 16 and a width of the longitude corresponding to the number of pixels in the horizontal direction on the screen of the LCD 16 are calculated from the number of pixels in the vertical direction and the number of pixels in the horizontal direction on the screen of the LCD 16 and the display zoom level Za, the latitude and longitude of each center of the upper and lower divided areas can be calculated from these values and the latitude and longitude of the center of the map image being displayed. Further, at the time of calculating the latitude and longitude of each center of the divided areas, instead of the number of pixels in the vertical direction and the number of pixels in the horizontal direction on the screen of the LCD 16, the number of pixels in the vertical direction and the number of pixels in the horizontal direction in the display area of the map image may be used.

The map application transfers the map acquisition request including the latitude and longitude of the center of the upper side area and the target zoom level Zb to the library (SA608). When the library receives the map acquisition request from the map application, the library transmits the map acquisition request to the server 200 (SB602).

When the server 200 receives the map acquisition request from the terminal 10, the server 200 transmits the map data in response to the map acquisition request (SC601). In other words, the server 200 transmits to the terminal 10 the map data corresponding to the map with the target zoom level Zb which is centered on the latitude and longitude of the center of the upper side area according to the map acquisition request. The map application acquires the map data transmitted by the server 200 through the library.

The library draws the map image on the basis of the map data received from the server 200 (SB603). As a result, the map image with the target zoom level Zb including the upper side area of the specific map area is drawn. The library transfers the drawn map image to the map application (SB604). The map application temporarily stores the drawing data of the map image received from the library in the RAM 13.

Next, the map application transfers the map acquisition request including the latitude and longitude of the center of the lower side area and the target zoom level Zb to the library (SA609). When the library receives the map acquisition request from the map application, the library transmits the map acquisition request to the server 200 (SB605).

When the server 200 receives the map acquisition request from the terminal 10, the server 200 transmits the map data in response to the map acquisition request (SC602). In other words, the server 200 transmits to the terminal 10 the map data corresponding to the map with the target zoom level Zb which is centered on the latitude and longitude of the center of the lower side area according to the map acquisition request. The map application acquires the map data transmitted by the server 200 through the library.

The library draws the map image on the basis of the map data received from the server 200 (SB606). As a result, the map image with the target zoom level Zb including the lower side area of the specific map area is drawn. The library transfers the drawn map image to the map application (SB607).

The map application combines the map image of the upper side area and the map image of the lower side area and extracts the image data included in the range of the specific map area from the combined image to generate the detailed map image (SA610). The detailed map image is stored as a predetermined format (for example, png format) file in the flash memory 12. The map application performs transition of the screen displayed in the LCD 16 to the editing screen 60 (SA611). The map application executes an editing screen display process (SA612).

Figure 7:
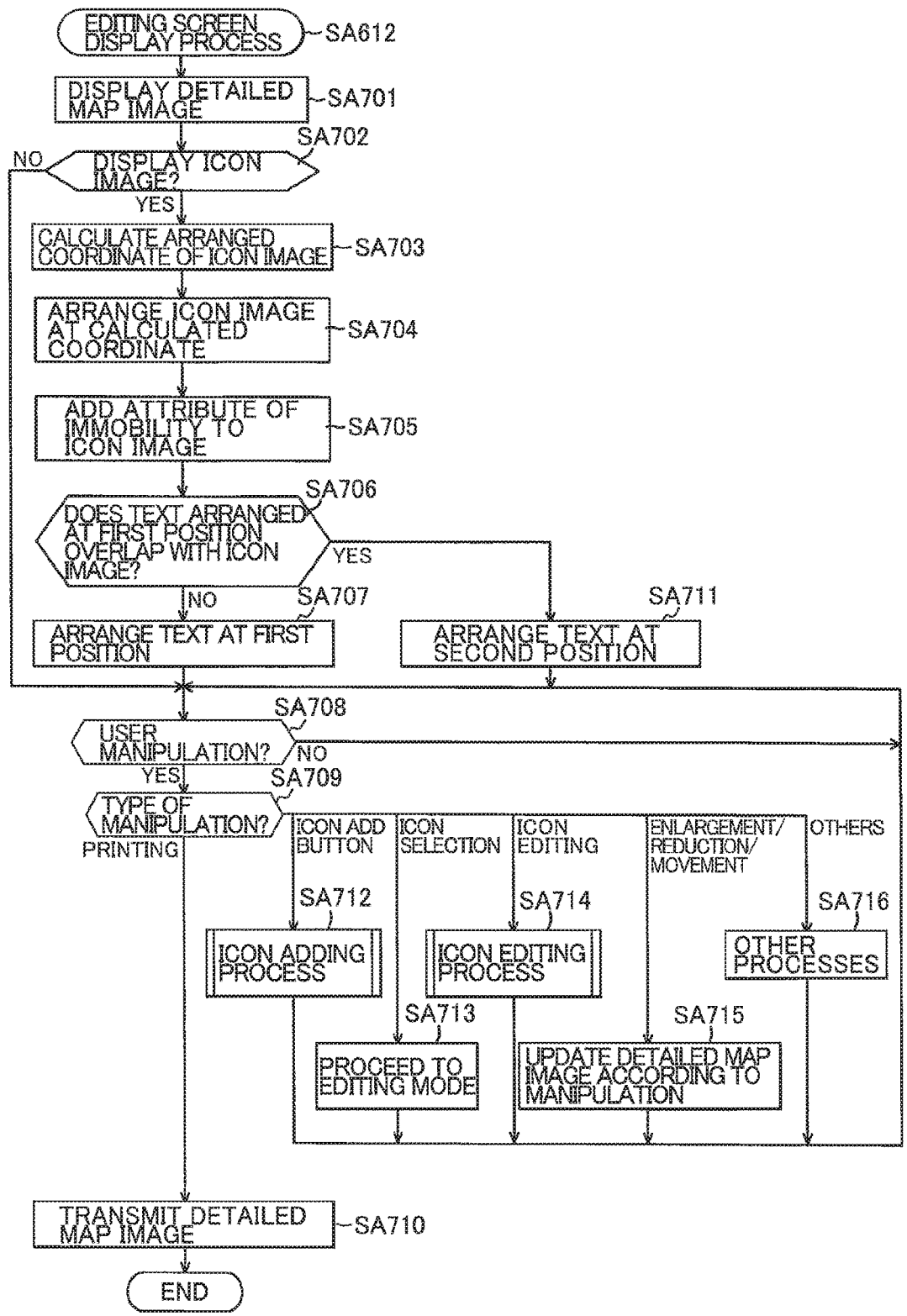
FIG. 7 is a flowchart illustrating steps of an editing screen display process.

The aforementioned editing screen display process (SA612) will be described with reference to FIG. 7. The flowchart illustrated in FIG. 7 shows a process executed by the CPU 11 through the map application. The map application displays the detailed map image generated in SA610 in the display frame 61 of the editing screen 60 (SA701). The map application determines whether or not to display the icon image in the detailed map image (SA702).

The map application performs the determination of SA702 according to the flag state which is installed in the RAM 13 and indicates whether or not to display the icon image in the detailed map image. More specifically, in a case where the flag is set to ON, the map application negates the determination of SA702. On the other hand, in a case where the flag is set to OFF, the map application affirms the determination of SA702.

In a case where the map application affirms the determination of SA702 (SA702: YES), the map application calculates the arranged coordinate of the icon image (SA703). More specifically, the map application calculates the arranged coordinate of the icon image on the basis of the normalized coordinate of the icon position and the number of pixels in the detailed map image. Further, the normalized coordinate of the icon position is included in the icon information stored in the flash memory 12 in SA606.

In other words, the map application specifies which order of pixels from the upper side pixel the pixel corresponding to the normalized coordinate is in the line of the pixels in the vertical direction in the detailed map image. Similarly, the map application specifies which order of pixels from the left side pixel the pixel corresponding to the normalized coordinate is in the line of the pixels in the horizontal direction in the detailed map image. The map application specifies each of the specified pixel positions in the vertical and horizontal directions as an arranged coordinate of the icon image.

The map application arranges the icon image object at the calculated arranged coordinate so as to be superposed on the detailed map image (SA704). Further, the arranged icon image is the icon image associated with the icon image ID included in the icon information. In other words, the icon image according to the location attribute of the destination is arranged so as to be superposed on the detailed map image.

The map application adds an attribute of immobility to the arranged icon image (SA705). As a result, the icon image arranged in SA704, that is, the icon image indicating the destination is not moved even when the user performs the manipulation (for example, swipe manipulation) for moving the icon image.

In a case where the text is arranged at a first position of the detailed map image, the map application determines whether or not the text overlaps with the icon image (SA706). In the embodiment, the first position is a position defined in the vicinity of the lower left corner of the detailed map image. The text is the text indicating the icon arranged location included in the icon image (that is, location name, address, and phone number). The map application performs the determination of SA706 on the basis of the size of the text object, the arranged coordinate of the icon, and the size of the icon image.

In a case where the map application determines that the text arranged at the first position does not overlap with the icon image (SA706: NO), the map application arranges the text object so as to be superposed at the first position of the detailed map image (SA707), and the map application allows the process to proceed to SA708.

On the other hand, in a case where the map application determines that the text arranged at the first position overlaps with the icon image (SA706: YES), the map application arranges the text object so as to be superposed at a second position of the detailed map image (SA711), and the map application allows the process to proceed to SA708. Further, the second position is a specified position different from the first position and, for example, a position defined in the vicinity of the upper left corner of the detailed map image. Therefore, according to the processes of SA706 and SA711, the overlap between the text and the icon image can be suppressed. Accordingly, it can be suppressed that the information transmission by the object is inhibited due to the overlap between the text and the icon image.

In a case where the map application negates the determination of SA702 (SA702: NO), the map application allows the process to proceed to SA708. In other words, in a case where the map application does not display the icon image in the detailed map image, the process of SA708 is executed without the processes of SA703 to SA707 and SA711 being executed.

Therefore, according to the process of SA702, even after the icon image is displayed by the search, in a case where the display area in the map image is moved and the specific map area is set in the state where the icon does not exist within a specific map area, the map image of the movement destination according to the movement is set as the specific map area irrespective of the search and is processed. Therefore, the map image can be displayed according to the user's intention.

The map application waits for the input of the user manipulation performed through the touch panel 17 on the editing screen 60 (SA708: NO). When the user manipulation on the editing screen 60 is input (SA708: YES), the map application determines the type of the input manipulation (SA709).

In a case where the map application determines that the input manipulation is manipulation on the icon add button 64 (SA709: ICON ADD BUTTON), the map application executes an icon adding process (SA712), and the map application allows the process to proceed to SA708. The icon adding process (SA712) is a process of adding an arbitrary icon image at an arbitrary position, and the details will be described later with reference to FIG. 8.

In a case where the map application determines that the input manipulation is manipulation of selecting the icon image (SA709: ICON SELECTION), the map application proceeds to an editing mode (SA713), and the map application allows the process to proceed to SA708. The manipulation of selecting the icon image is tap manipulation on the icon image displayed in the detailed map image.

In a case where the map application determines that the input manipulation is manipulation about the icon editing in the editing mode (SA709: ICON EDITING), the map application executes an icon editing process (SA714), and the map application allows the process to proceed to SA708. The icon editing process is a process of editing the icon image, and the details will be described later with reference to FIG. 9.

In a case where the map application determines that the input manipulation is manipulation instructing enlargement or reduction of the display area in the detailed map image, or movement of the display area in the detailed map image (SA709: ENLARGEMENT/REDUCTION/MOVEMENT), the map application updates the detailed map image displayed on the editing screen 60 to the detailed map image reflecting the change according to the manipulation (SA715), and the map application allows the process to proceed to SA708.

The manipulation instructing the enlargement of the display area in the detailed map image is pinch-out manipulation on the detailed map image. The manipulation instructing the reduction of the display area in the detailed map image is pinch-in manipulation on the detailed map image. The manipulation instructing the movement of the display area in the detailed map image is swipe manipulation on the detailed map image. Further, since the detailed map image is the map image limited to the specific map area, the enlargement, the reduction, and the movement are performed with the range of the detailed map image.

In a case where the map application determines that the input manipulation is other manipulations (SA709: OTHERS), the map application executes processes according to the input manipulation as other processes (SA716), and the map application allows the process to proceed to SA708. As other processes (SA716), for example, there is a process of arranging the object of the free line input through the touch panel 17 so as to be superposed on the detailed map image when the free-line write button 65 is manipulated.

In a case where the map application determines that the input manipulation is manipulation on the printing button 66 (SA709: PRINTING), the map application transmits the detailed map image to the printer 200 through the wireless communication interface 23 (SA710), and the map application allows the process to be ended. As a result, in the printer 100, the detailed map image is printed on the printing paper.

In a case where the map application does not perform the editing of the detailed map image output to the printer 100, the map application outputs to the printer 100 the file of the detailed map image which is generated in SA610 and stored in the flash memory 12. On the other hand, in a case where the map application performs the editing of the detailed map image output to the printer 100, the map application generates a file of the detailed map image reflecting the editing apart from the file of the detailed map image generated in SA610 and outputs the file of the detailed map image reflecting the editing to the printer 100. Therefore, in a case where any editing is performed on the detailed map image, the detailed map image reflecting the editing can be printed on the printer 100.

Further, in SA715, the detailed map image displayed on the editing screen 60 is updated to the detailed map image reflecting the change according to the manipulations, and thus, in some cases, the entire specific map area may not be displayed on the editing screen 60. However, even in the case, the detailed map image output to the printer 100 is the detailed map image in the specific map area. Therefore, even in a case where the contents of the editing screen do not include the entire specific map area, the initially-set contents of the specific map area can be printed.

Figure 8:
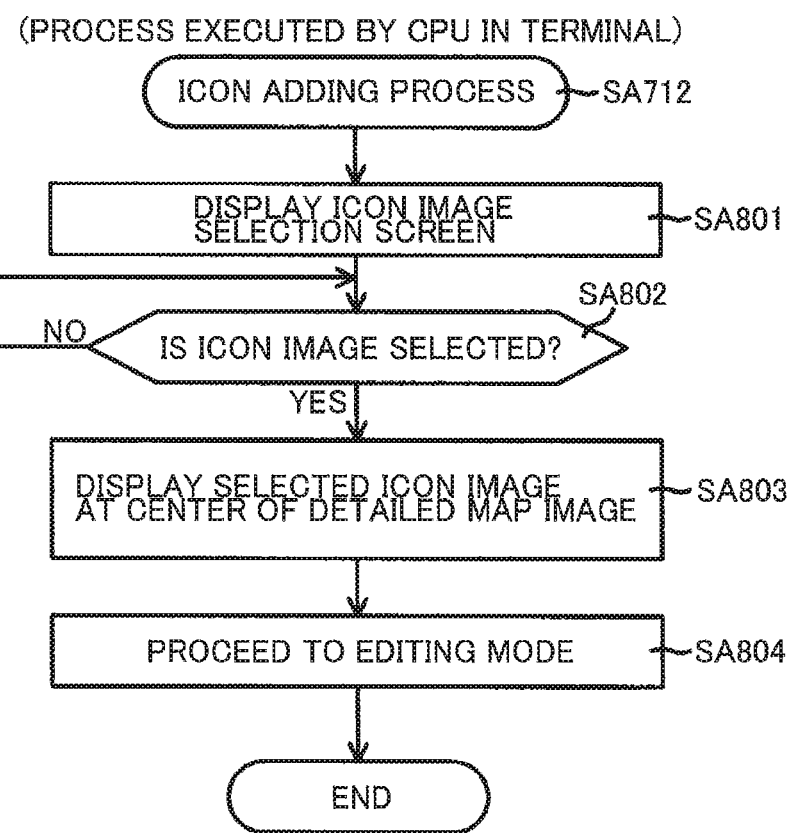
FIG. 8 is a flowchart illustrating steps of an icon adding process.

The above-described icon adding process (SA712) will be described with reference to FIG. 8. The flowchart illustrated in FIG. 8 is a process executed by the CPU 11 through the map application. The map application displays an icon image selection screen so as to be superposed on the editing screen 60 (SA801). A list of available icon images is displayed on the icon image selection screen. The user can select an icon image by performing tap manipulation on the to-be-added icon image.

Figure 10A:
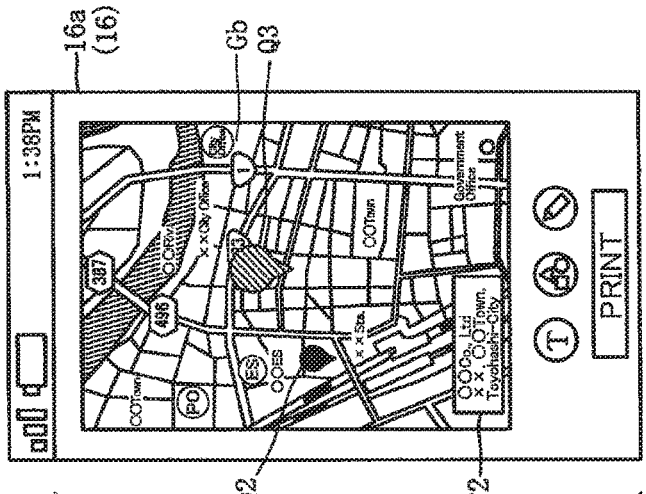
FIG. 10A is a diagram illustrating an example of an editing screen to which an icon is added in the icon adding process.

The map application waits for selection of the icon image performed through the touch panel 17 (SA802: NO). In a case where the manipulation of selecting the icon image is input (SA802: YES), the map application arranges the selected icon image object so as to be superposed at the center of the detailed map image (SA803). Therefore, for example, in a case where the manipulation of selecting the icon image Q3 is input, as illustrated in FIG. 10A, as a result of the process of SA803, the object of the icon image Q3 is arranged so as to be superposed at the center of the detailed map image. After the process of SA803, the map application proceeds to the editing mode (SA804) and allows the process to be ended.

Figure 9:
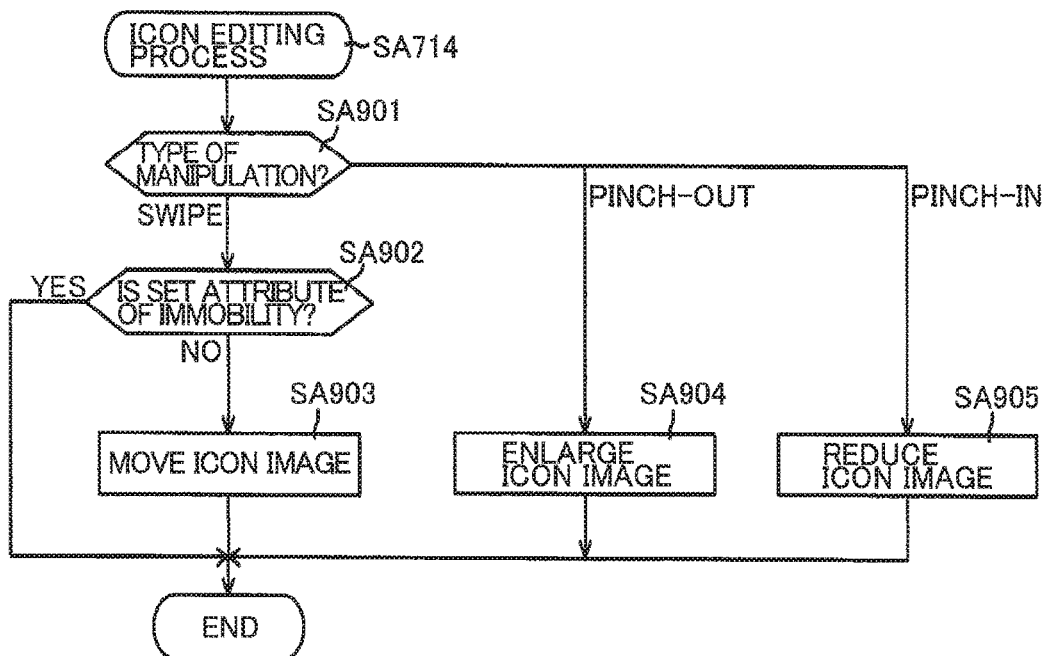
FIG. 9 is a flowchart illustrating steps of an icon editing process.

The aforementioned icon editing process (SA714) will be described with reference to FIG. 9. The flowchart illustrated in FIG. 9 is a process executed by the CPU 11 through the map application. The map application determines the type of the manipulation that is a trigger of the process (SA901). As the manipulation that is a trigger of the process, there are swipe manipulation instructing the movement of the icon image, pinch-out manipulation instructing the enlargement of the icon image, and pinch-in manipulation instructing the reduction of the icon image.

In a case where the map application determines that the input manipulation is the swipe manipulation instructing the movement of the icon image (SA901: SWIPE), the map application determines whether or not the attribute of immobility is set for the to-be-manipulated icon image (SA902).

In a case where the map application determines that the attribute of immobility is set for the to-be-manipulated icon image (SA902: YES), the map application allows the process to be ended. On the other hand, in a case where the map application determines that the attribute of immobility is not set for the to-be-manipulated icon image (SA902: NO), the map application moves the to-be-manipulated icon image to the swiped position (SA903), and the map application allows the process to be ended.

Figure 10B:
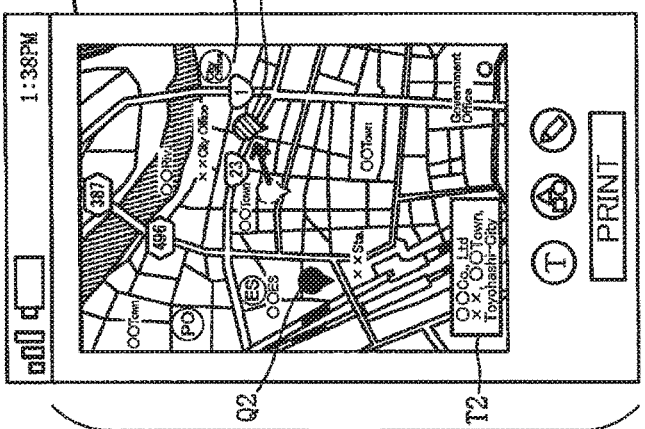
FIG. 10B is a diagram illustrating an example of the editing screen where the icon is moved in the icon editing process.

Therefore, according to the processes of SA902 and SA903, if the attribute of immobility is not set for the to-be-manipulated icon image, the icon image is moved according to the swipe manipulation. On the other hand, if the attribute of immobility is set for the to-be-manipulated icon image, the map application does not move the icon image even when the user performs the swipe manipulation. The icon image for which the attribute of immobility is set is only the icon image Q2 indicating the destination. Therefore, the icon image Q2 can securely inform the user of the destination. On the other hand, for example, the icon image Q3 added in the icon adding process (SA712) can be moved in response to the swipe manipulation as illustrated in FIG. 10B. Therefore, the icon image Q3 can indicate an arbitrary location.

Figure 10C:
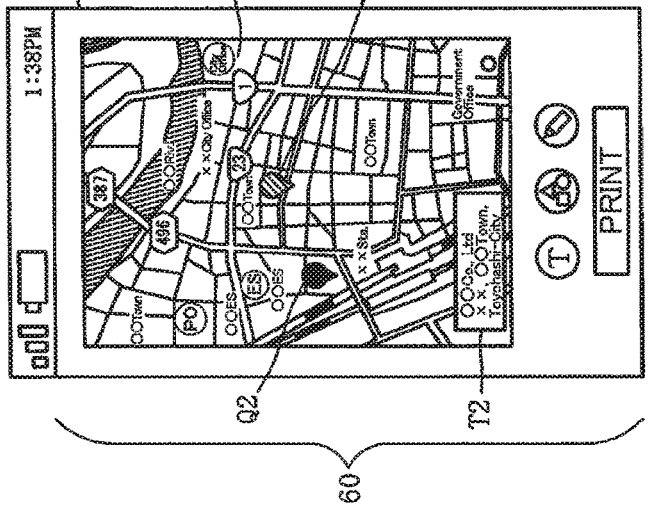
FIG. 10C is a diagram illustrating an example of the editing screen where the icon is enlarged in the icon editing process.

In a case where the map application determines that the input manipulation is the pinch-out manipulation instructing the enlargement of the icon image (SA901: PINCH-OUT), the map application enlarges the to-be-manipulated icon image according to the distance of the pinch-out manipulation (SA904), and the map application allows the process to be ended. Therefore, for example, in a case where the pinch-out manipulation for the icon image Q3 is input, as a result of the process of SA904, the icon image Q3 is enlarged as illustrated in FIG. 10C. Further, in a case where the target of the pinch-out manipulation is the icon image Q2 indicating the destination, the icon image Q2 is enlarged in response to the pinch-out manipulation, similarly.

In a case where the map application determines that the input manipulation is pinch-in manipulation instructing the reduction of the icon image (SA901: PINCH-IN), the map application reduces the to-be-manipulated icon image according to the distance of the pinch-in manipulation (SA905), and the map application allows the process to be ended. Both of the icon image Q2 and the icon image Q3 are the icon images as the target of the pinch-in manipulation. Further, in a case where the map application enlarges or reduces the icon image, the map application enlarges or reduces the icon image so that the portion of the icon image indicating the position is not moved.

According to the embodiment, in the detailed map image displayed on the editing screen 60, the icon image indicating the position (that is, destination) designated by the user or the text indicating the information on the designated position are superposed as objects. In other words, since the detailed map image, the icon image, and the text exist as individual objects, these objects can be treated independently. Therefore, the editing task for the detailed map image can be facilitated.

In addition, according to the embodiment, the target zoom level Zb by which the size of the specific map area becomes the size of the detailed map image is determined on the basis of the display zoom level Za of the map image being displayed in the LCD 16. Therefore, the map of the detailed map image can be set to be the map with the scale according to the image size. Accordingly, it can be suppressed that the information amount of the map of the detailed map image is inappropriate for the image size.

Further, the target zoom level Zb is calculated as a value according to the ratio of the number of pixels Pa in the horizontal direction on the screen of the LCD 16 and the number of pixels Pb in the horizontal direction as the target at the time of printing (that is, the number of pixels in the horizontal direction in the detailed map image). As a result, since the number of pixels in the detailed map image has the value according to the number of pixels in the map image being displayed in the LCD 16, it can be suppressed that the detailed map image becomes an image which is rougher than the map image being displayed in the LCD 16, and a deterioration in image quality at the time of printing can be suppressed.

Furthermore, when the user manipulation instructing the enlargement of the map scale is input on the area setting screen 50, in a case where the detailed map image cannot be acquired from the map image which is enlarged according to the instruction, the scale enlargement based on the user's instruction is prohibited. Therefore, in a case where the map image in the specific map area is printed, the printing result of an appropriate image quality can be secured.

Figure 11:
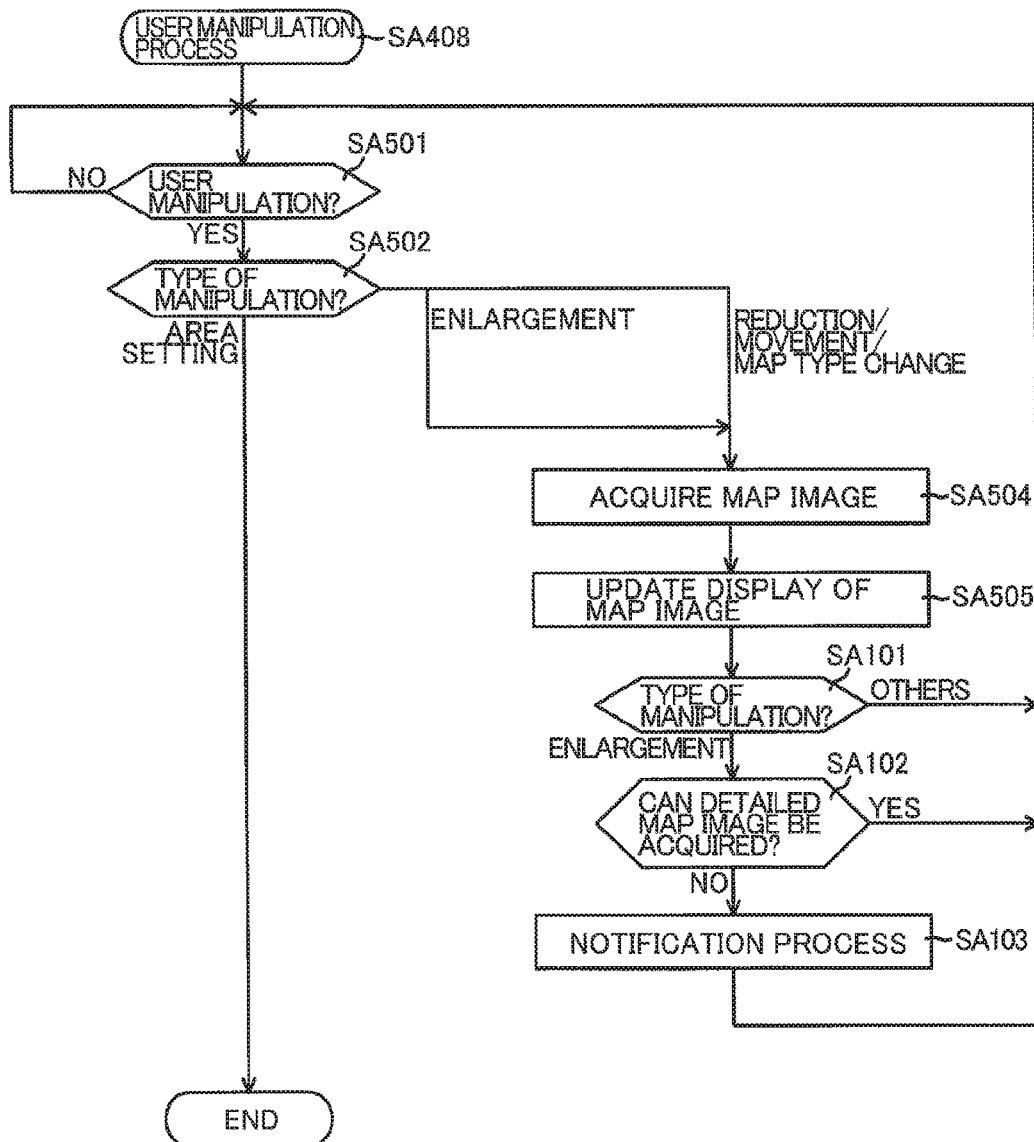
FIG. 11 is a flowchart illustrating steps of a user manipulation process in a second embodiment.

Next, a second embodiment will be described with reference to FIG. 11. In the configuration of the above-described first embodiment, when the user manipulation instructing the enlargement of the map scale is input on the area setting screen, the scale enlargement is prohibited in a case where the detailed map image cannot be acquired from the map image of which the scale is enlarged according to the user manipulation.

Alternatively, in the second embodiment, in a case where the detailed map image cannot be acquired from the map image of which the scale is enlarged according to the user manipulation, the map image of which the scale is enlarged in response to the user manipulation is drawn, and after that, a message thereof is notified. In the second embodiment, the same parts and components as those of the first embodiment are designated by the same reference numerals, and the description thereof is omitted.

Hereinafter, a configuration unique to the second embodiment will be mainly described. FIG. 11 illustrates a user manipulation process (SA408) of the second embodiment. The process is a process executed by the CPU 11 of the terminal 10 according to the map application of the second embodiment.

In a case where the map application determines that the input manipulation is manipulation instructing the enlargement of the map scale (for example, pinch-out manipulation) (SA502: ENLARGEMENT), unlike the first embodiment, the CPU 11 executes the processes of SA504 and SA505 irrespective whether or not the detailed map image can be acquired. In other words, the map application acquires the map data for drawing the map image of which the scale is enlarged in response to the user manipulation from the server 200 through the library.

After the process of SA505, the map application determines the type of the user manipulation that is a trigger of SA504 and SA505 (SA101). In a case where the map application determines that the manipulation other than the manipulation instructing the enlargement of the map scale is performed (SA101: OTHERS), the map application allows the process to proceed to SA501.

On the other hand, in a case where the map application determined that the manipulation instructing the enlargement of the map scale is performed (SA101: ENLARGEMENT), similarly to the above-described SA503, the map application determines with respect to the map image of which the scale is enlarged according to the user manipulation whether or not the detailed map image can be acquired from the map image (SA102).

In a case where the map application affirms the determination of SA102 (SA102: YES), the map application allows the process to proceed to SA501. On the other hand, in a case where the map application negates the determination of SA102 (SA102: NO), that is, in a case where the map application cannot acquire the detailed map image from the map image of which the scale is enlarged in response to the user manipulation, the CPU 11 performs a notification process of notifying a message thereof (SA103), and the map application allows the process to proceed to SA501.

The notification performed in SA103 is, for example, performed by performing a pop-up display on the map image updated in SA505. As an example of the contents of the notification, there is text information "when printing is performed with this scale, there is a possibility that a good image quality cannot be obtained". Notification by predetermined mark display or sound may be performed.

In the embodiment, in a case where the map image with the zoom level by which the detailed map image cannot be acquired (that is, the map image as a target of notification in SA103) is set as the specific map area, not the zoom level calculated by the above equation $Zb=Za+\log_2(Pb/Pa)$ but the map data of the zoom level of the maximum value which can be taken as the zoom level is acquired from the server 200.

Further, the map data of the zoom level calculated by the above equation $Zb=Za+\log_2(Pb/Pa)$ may be acquired from the server 200 by setting the specific map area as the area configured with the area set by the user and the peripheral area thereof and by substantially lowering the display zoom level Za from the current value. In this case, since the area wider than the area set by the user is printed, the image quality of the map image by the printing becomes appropriate although the area that is intended as the specific map area by the user is printed to be relatively smaller.

According to the second embodiment, when the user manipulation instructing the enlargement of the map scale is input on the area setting screen, a possibility that a printing result of an appropriate image quality cannot be obtained is notified to the user in a case where the detailed map image cannot be acquired from the map image which is enlarged in response to the instruction. Therefore, the user can recognize the possibility that the printing result of an appropriate image quality cannot be obtained because of enlarging the scale.

In the above-described embodiments, the map application is an example of program instructions. The terminal 10 where the map application is installed is an example of an information processing device. The server 200 is an example of a first server. The server 300 is an example of a second server. The library is an example of a drawing module. The CPU 11 is an example of a controller. The LCD 16 is an example of a display. The wireless communication interface 23 is an example of a communication interface. The touch panel 17 is an example of a manipulation unit. The latitude and longitude are an example of position information.

While the description has been made in detail with reference to specific embodiments thereof, it would be apparent to those skilled in the art that various changes and modifications may be made therein without departing from the spirit and scope of the above described embodiments.

For example, in the above-described embodiments, the terminal 10 such as a smartphone is exemplified as the information processing device in which the map application is installed. However, a device such as a tablet terminal, a personal computer, a navigation device, a music reproducing device, or a digital camera can be employed as the information processing device in which the map application is to be installed. In the above-described embodiments, the OS installed in the terminal 10 is described to be the Android® OS. However, configurations employing other OSs may be used.

In the above-described embodiments, the configuration of performing editing the detailed map image of which the zoom level is heightened is used. However, a configuration of performing editing the map image in the state where the original zoom level is maintained without generating the detailed map image may be used.

In the above-described embodiments, at the time of obtaining the detailed map image, the configuration of dividing the specific map area into two areas such as the upper and lower areas and drawing the detailed map images for the divided areas is used. However, in a case where the size of the frame buffer is allowed, a configuration of generating the detailed map image as the specific map area itself by one-time acquisition and drawing of the map data without dividing the specific map area may be used. In addition, the number of divided areas is not limited to two, but a configuration of performing division into four areas of 2 stages×2 columns or into nine areas of 3 stages×3 columns may be used.

In the above-described embodiments, it is defined that the map scale is enlarged two times as the value of the zoom level is increased by 1. However, the map scale may be increased J-times (J is a natural number of 3 or more) as the value of the zoom level is increased by 1. In the modified example, the equation of calculation of the target zoom level Zb becomes $Za+\log_J(Pb/Pa)$. In other words, the value of the base in the above equation is changed according to the definition of the zoom level.

In the above-described embodiments, the configuration of calculating the target zoom level Zb from the number of pixels Pa in the horizontal direction on the screen of the LCD 16 and the number of pixels Pb in the horizontal direction as a target at the time of printing by using the calculation equation. However, a configuration where a combination of the number of pixels Pb and $\log_2(Pb/Pa)$ is prepared as a table may be used.

In the above-described embodiments, the configuration where the position of the acquired map is specified by setting the latitude and longitude of the center as a reference position is used. However, the reference position is not limited to the center. According to the specifications of the API which provides the map data, an appropriate position can be set as the reference position for acquiring the map.

In the above-described embodiments, the configuration of acquiring the location name, the address, the phone number, the location attribute, and the latitude and longitude from the location information transmitted by the server 300 in SD401 is used. However, the timings of acquiring the location name, the address, the phone number, the location attribute, and the latitude and longitude may be different from each other.

In the above-described embodiments, in a case where the text object is superposed on the detailed map image, the position defined in the vicinity of the lower left corner of the detailed map image is set as the first position. The first position is not limited to a fixed position in the detailed map image (or the editing screen 60), but the first position may be a position specified relative to the icon image as a target.

In the above-described embodiments, the configuration of returning a plurality of the search results in response to the search request from the map application and selecting the destination among a plurality of search results is used. Alternatively, a configuration of returning a reduced one search result in response to the search request from the map application may be used.

In the above-described embodiments, the paper size is fixed to the A4 size. However, the paper size may be a size which the user selects as one of the printing settings in the displaying of the area setting screen 50. In this case, every time when the paper size is changed, the aspect ratio of the map image which is to be displayed on the area setting screen 50 may be configured to be changed. Further, as described above, since the number of pixels at the time of printing is determined according to the paper size and the printing resolution, in a case where the paper size is changed, the number of pixels at the time of printing is also changed. Therefore, in a case where the paper size is changed, the target zoom level Zb is calculated by using the number of pixels Pb according to the changed paper size.

In addition, in the above-described embodiments, 248 dpi is exemplified as the printing resolution. However, a configuration of using the value which the user selects among a plurality of printing resolutions as the printing settings may be used. In this case, similarly to the above-described case of the paper size, the number of pixels at the time of printing is changed. Therefore, in a case where the printing resolution is changed, the target zoom level Zb is calculated by using the number of pixels Pb according to the changed printing resolution.

In the above-described embodiments, the server 200 which is a map server and the server 300 which provides the location information are described to be separate servers. However, a configuration of using one server having a function as the map server and a function as the server providing the location information may be used.

In the above-described embodiments, the configuration where the CPU 11 executes the processes illustrated in FIGS. 4 to 9 is described. However, a configuration where the processes illustrated in the figures are cooperatively executed by a plurality of CPUs may be used. In addition, a configuration where the processes illustrated in the figured are executed by a single IC such as ASIC or are cooperatively executed by a plurality of ICs may be used. Furthermore, a configuration where the processes illustrated in the figures are cooperatively executed by the CPU 11 and the IC such as ASIC may be used.

In addition, among the processes illustrated in FIGS. 4 to 9, some processes may be omitted or changed within the scope without departing from independent claims of the claims. Furthermore, a configuration where an appropriate combination of features described in the above-described embodiments and above-described modified examples are embodied may be used.

What is claimed is:

1. A non-transitory computer readable storage medium storing a set of program instructions installed on and executed by an information processing device, the information processing device comprising: a display; a communication interface; a manipulation unit; and a controller, the program instructions, when executed by the controller, cause the information processing device to perform:

requesting first map data indicative of a first map image from a first server through the communication interface, the first map image including at least a first area designated by position information;

receiving specified position information from a second server through the communication interface, the specified position information being indicative of a target position within the first area, the target position being based on an input to the information processing device;

receiving a second map image drawn by a drawing module on the basis of the requested first map data, the second map image being indicative of the first area;

inputting the specified position information to the drawing module to draw a third map image on the basis of the specified position information, the third map image including the second map image and a first icon image drawn at the target position in the second map image and being indicative of a second area, the second area including at least a part of the first area;

displaying a first screen image on the display, the first screen image including the third map image;

acquiring a fourth map image upon receipt of a first signal from the manipulation unit, the first signal indicating a request for editing the third map image included in the first screen image, the fourth map image including the second area;

acquiring a relative position of the first icon image with respect to the third map image upon receipt of the first signal from the manipulation unit;

displaying a second screen image on the display, the second screen image including a fifth map image indicating the fourth map image on which a second icon image is superposed at a first icon-position specified on the basis of the relative position;

acquiring a third icon image upon receipt of a second signal from the manipulation unit, the second signal indicating a request for editing the second icon image, the third icon image being acquired by changing at least one of the first icon-position of the second icon image relative to the fourth map image and a size of the second icon image relative to the fourth map image according to the request for editing the second icon image; and displaying a third screen image on the display, the third screen image including a sixth map image indicating the fourth map image on which the third icon image is superposed.

2. The non-transitory computer readable storage medium according to claim 1, wherein the position information is indicative of a current geographical position in which the information processing device is currently located.

3. The non-transitory computer readable storage medium according to claim 1, wherein the specified position information is received from the second server in response to an input by a user to the manipulation unit about a target geographical position.

4. The non-transitory computer readable storage medium according to claim 1, wherein the program instructions, when executed by the controller, cause the information processing device to further perform:

requesting second map data indicative of the fourth map image from the first server through the communication interface upon receipt of the first signal, the fourth map image including at least the second area designated by the position information, a scale of the fourth map image being larger than a scale of the third map image;

receiving the fourth map image drawn by the drawing module on the basis of the requested second map data, the fourth map image being indicative of the second area, a scale of the fourth map image being larger than a scale of the third map image; and acquiring the fifth map image by superposing the second icon image at the first icon-position on the fourth map image; and wherein the displaying the second screen image displays the second screen image including the fifth map image.

5. The non-transitory computer readable storage medium according to claim 1, wherein an aspect ratio of the fifth map image included in the second screen image is equal to an aspect ratio of the third map image included in the first screen image.

6. The non-transitory computer readable storage medium according to claim 1, wherein the program instructions, when executed by the controller, cause the information processing device to further perform:

receiving location attribute information indicative of a location attribute of the target position; and wherein the inputting the specified position information further inputs classification information corresponding to the location attribute to the drawing module to draw the first icon image according to the classification information in the third map image.

7. The non-transitory computer readable storage medium according to claim 6, wherein the displaying the second screen image displays the second screen image including the fifth map image on which the second icon image according to the classification is superposed.

8. The non-transitory computer readable storage medium according to claim 1, wherein the program instructions, when executed by the controller, cause the information processing device to further perform:

receiving additional information related to the target position from the second server through the communication interface;

wherein the inputting the specified position information further inputs the additional information to the drawing module to draw the third map image on which a text indicative of the additional information is superposed at a first text-position on the third map image;

wherein the displaying the first screen image displays the first screen image including the third map image on which the text is superposed at the first text-position; and wherein the displaying the second screen image displays the second screen image including the fifth map image on which the second icon image is superposed at the first icon-position and on which the text is superposed at the first text-position.

9. The non-transitory computer readable storage medium according to claim 8, wherein the program instructions, when executed by the controller, cause the information processing device to further perform:

determining whether the text superposed at the first text-position overlaps the second icon image superposed at the first icon-position in the second screen image;

wherein the displaying the second screen image displays the second screen image including the fifth map image on which the second icon image is superposed at the first icon-position and on which the text is superposed at the first text-position in response to a determination that the text does not overlap the second icon image; and wherein the displaying the second screen image displays the second screen image including the fifth map image on which the second icon image is superposed at the first icon-position and on which the text is superposed at a second text-position different from the first text-position in response to a determination that the text overlaps the second icon image.

10. The non-transitory computer readable storage medium according to claim 9, wherein the first text-position is a fixed position on the second screen image.

11. The non-transitory computer readable storage medium according to claim 9, wherein the first text-position is a relative position relatively specified with respect to the first icon-position.

12. The non-transitory computer readable storage medium according to claim 1, wherein the program instructions, when executed by the controller, cause the information processing device to further perform:

determining whether the first icon image positioned at the relative position on the third map image is within the second area designated by the position information upon receipt of the first signal;

wherein the acquiring the fourth map image acquires a map image having a size equal to size of the second area as the fourth map image in response to a determination that the second icon image is within the second area; and wherein the acquiring the fourth map image acquires a map image having a size larger than a size of the second area as the fourth map image in response to a determination that the second icon image is not within the second area.

13. The non-transitory computer readable storage medium according to claim 12, wherein the determining determines whether the first icon image is within the second area designated by the position information on the basis of the relative position and a size of the first icon image.

14. The non-transitory computer readable storage medium according to claim 1, wherein the program instructions, when executed by the controller, cause the information processing device to further perform:

requesting third map data indicative of a sixth map image from the first server through the communication interface upon receipt of a third signal from the manipulation unit, the third signal indicating an instruction of moving an area of the third map image included in the first screen image to a different area, the sixth map image indicative of a third area including at least the different area;

receiving the sixth map image drawn by the drawing module on the basis of the requested third map data;

displaying a third screen image including the sixth map image;

determining whether the target position is within the sixth map image upon receipt of the first signal;

acquiring a seventh map image upon receipt of the first signal, the seventh map image including the third area;

displaying a fourth screen image including the seventh map image on which the second icon image is superposed at the first icon-position in response to a determination that the target position is within the sixth map image; and displaying the fourth screen image including the seventh map image on which the second icon image is not superposed in response to a determination that the target position is out of the sixth map image.

15. An information processing device comprising:
a display:
a communication interface;
a manipulation unit; and
a controller configured to perform:

requesting map data indicative of a first map image from a first server through the communication interface, the first map image including at least a first area designated by position information;

receiving specified position information from a second server through the communication interface, the specified position information being indicative of a target position within the first area, the target position being based on an input to the information processing device;

receiving a second map image drawn by a drawing module on the basis of the requested map data, the second map image being indicative of the first area;

inputting the specified position information to the drawing module to draw a third map image on the basis of the specified position information, the third map image including the second map image and a first icon image drawn at the target position in the second map image and being indicative of a second area, the second area including at least a part of the first area;

displaying a first screen image on the display, the first screen image including the third map image;

acquiring a fourth map image upon receipt of a first signal from the manipulation unit, the first signal indicating a request for editing the third map image included in the first screen image, the fourth map image including the second area;

acquiring a relative position of the first icon image with respect to the third map image upon receipt of the first signal from the manipulation unit;

displaying a second screen image on the display, the second screen image including a fifth map image indicating the fourth map image on which a second icon image is superposed at an icon-position specified on the basis of the relative position;

acquiring a third icon image upon receipt of a second signal from the manipulation unit, the second signal indicating a request for editing the second icon image, the third icon image being acquired by changing at least one of the first icon-position of the second icon image relative to the fourth map image and a size of the second icon image relative to the fourth map image according to the request for editing the second icon image; and displaying a third screen image on the display, the third screen image including a sixth map image indicating the fourth map image on which the third icon image is superposed.

16. The non-transitory computer readable storage medium according to claim 1, wherein the program instructions, when executed by the controller, cause the information processing device to further perform:

acquiring a fourth icon image upon receipt of a third signal from the manipulation unit, the third signal indicating a request for adding a new icon image; and displaying a fourth screen image on the display, the fourth screen image including a seventh map image indicating the fourth map image on which the second icon image and the fourth icon image are superposed.

* * * * *